United States Patent
Hiroe et al.

(10) Patent No.: US 7,318,613 B2
(45) Date of Patent: Jan. 15, 2008

(54) LONG ORNAMENT MEMBER AND METHOD FOR MANUFACTURING THE SAME

(75) Inventors: Keiji Hiroe, Aichi (JP); Yasuhiro Fukushima, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 105 days.

(21) Appl. No.: 10/533,435

(22) PCT Filed: Aug. 26, 2004

(86) PCT No.: PCT/JP2004/012678

§ 371 (c)(1),
(2), (4) Date: May 24, 2005

(87) PCT Pub. No.: WO2005/028231

PCT Pub. Date: Mar. 31, 2005

(65) Prior Publication Data

US 2006/0186695 A1   Aug. 24, 2006

(30) Foreign Application Priority Data

Sep. 17, 2003 (JP) ............................ 2003-324026
Jan. 8, 2004 (JP) ............................ 2004-002536

(51) Int. Cl.
*C08J 9/38* (2006.01)
*B60J 10/02* (2006.01)

(52) U.S. Cl. .................. 296/1.08; 49/475.1; 277/652

(58) Field of Classification Search ............ 296/146.9, 296/76, 1.08; 49/475.1, 490.1, 498.1; 277/652; 264/177.1, 177.17, 211.12; 428/122, 137
See application file for complete search history.

(56) References Cited

U.S. PATENT DOCUMENTS 3,198,689 A    8/1965    Lansing (Continued)

FOREIGN PATENT DOCUMENTS

FR    1.421.604    12/1965

(Continued)

*Primary Examiner*—Jason S Morrow
(74) *Attorney, Agent, or Firm*—Oliff & Berridge, PLC

(57) ABSTRACT

A long ornament member $W_1$ has an attaching portion 1 and an ornamental portion 3 constituted by vulcanized rubber integrally formed on a surface of the attaching portion 1. The ornamental portion 3 has a surface roughened by plural microcapsules thermally expanded therein, plural concave portions 6a outwardly opened in the microcapsules 6 that burst on or in the vicinity of the ornamental portion 3, and plural projection portions 6b constituted by outwardly swelling the microcapsules 6 expanded in the vicinity of the surface. At least one of plural convex ridges and plural concave grooves are formed on the surface of the ornamental portion 3, the convex ridges extending along at least one of a longitudinal direction and a lateral direction that crosses the longitudinal direction, the concave grooves extending along at least one of the longitudinal direction and the lateral direction.

34 Claims, 16 Drawing Sheets

U.S. PATENT DOCUMENTS

| | | |
|---|---|---|
| 4,830,898 A | 5/1989 | Smith |
| 5,143,772 A * | 9/1992 | Iwasa .......................... 428/122 |
| 6,686,020 B2 * | 2/2004 | Sakuma ....................... 428/122 |
| 6,786,007 B2 * | 9/2004 | Aritake ......................... 49/506 |
| 6,874,281 B2 * | 4/2005 | Fujita et al. ............... 49/490.1 |
| 7,124,539 B2 * | 10/2006 | Tsuchida et al. ........... 49/490.1 |
| 7,152,374 B2 * | 12/2006 | Gopalan ....................... 49/506 |
| 2003/0220411 A1 * | 11/2003 | Sakai et al. ................. 521/134 |
| 2004/0043188 A1 * | 3/2004 | Tsujiguchi ................... 428/122 |
| 2004/0189044 A1 * | 9/2004 | Nagata ..................... 296/146.9 |
| 2007/0024084 A1 * | 2/2007 | Oba et al. ................ 296/146.9 |

FOREIGN PATENT DOCUMENTS

| | | |
|---|---|---|
| GB | 27118 | 10/1914 |
| JP | A 2002-146087 | 5/2002 |
| WO | WO 01/96135 A2 | 12/2001 |

* cited by examiner

LONG ORNAMENT MEMBER AND METHOD FOR MANUFACTURING THE SAME

TECHNICAL FIELD

The present invention relates to a long ornament member having an ornamental portion that provides a woven fabric-like appearance and to a manufacturing method thereof.

BACKGROUND ART

Trimming members, such as a weather strip, which is attached along an opening edge of an opening/closing door of a vehicle like an automobile, for preventing rainwater from entering inside the vehicle, are cited as the long ornament member. An elongated sealing member to be inserted into and used for sealing the gap between one wall panel and an adjacent wall panel of a building is cited as another example of the long ornament member. It is usual that the ornament members, such as the weather strip and the sealing member, are elongatedly formed by extrusion-molding of kneaded black rubber, into which black carbon is mixed, and that the ornament member is produced by being cut to a predetermined length.

Regarding the weather strip among the aforementioned trimming members, with the diversification of taste, there have been demands for a weather strip whose visible part (or ornamental portion) shows a color and a pattern respectively matching (or being harmonious with) the color, which is other than black that the rubber shows, and the pattern, especially, of the interior component of a vehicle. To meet such demands, it has been performed to adhere a cloth actually showing a non-black color to the surface of the black ornamental portion. However, the cost of the cloth is high. Also, there is a limit to the choice of adhesive suitable for adhering the cloth. Additionally, the adhesion process needs complex and troublesome control, which results in an increase in the manufacturing cost of the ornament member. To solve the aforementioned problem, the applicant of the present application has proposed a trimming member, which can be easily manufactured, and a manufacturing method (see JP-A-2002-146087).

However, although the invention described in JP-A-2002-146087 shows good effects against the problem, an ornament member exhibiting an appearance, which more closely resembles the appearance of an actual woven cloth, has become demanded with advancement of the performance thereof required by consumers.

DISCLOSURE OF THE INVENTION

An object of the present invention is to provide an ornament member, which shows an appearance more resembling the appearance of an actual woven cloth, from the standpoint that is an extension of the invention disclosed in JP-A-2002-146087, and to provide a manufacturing method thereof.

To solve the aforementioned problems, according to a first aspect of the invention, there is provided a long ornament member having an attaching portion being attachable to a body to be attached; and an ornamental portion made of a vulcanized rubber and integrally formed on a surface of the attaching portion; wherein the ornamental portion has a surface roughened by a plurality of microcapsules thermally expanded in the ornamental portion, a plurality of concave portions of the microcapsules burst on or in the vicinity of the surface, the concave portions being outwardly opened, and a plurality of projection portions constituted by the microcapsules expanded in the vicinity of the surface and swelling outwardly; and wherein the surface of the ornamental portion is provided with at least one of plural convex ridges and plural concave grooves, the convex ridges extending along at least one of a longitudinal direction and a lateral direction that crosses the longitudinal direction, the concave grooves extending along at least one of the longitudinal direction and the lateral direction.

According to a second aspect of the invention, in the member according to the first aspect, at least one of the convex ridges and the concave grooves are configured in a manner that at least one of discontinuity portions and deformation portions are formed at irregular positions in an extending direction thereof by at least one of the concave portions and the projection portions.

The surface of the ornamental portion formed of vulcanized rubber is formed into an irregularly roughened surface due to the combination of the many fine microcapsules thermally expanded therein, the concave portions formed due to the burst of microcapsules provided on or in the vicinity of the surface, and the projection portions formed due to the swelling of the microcapsules provided on the surface. Thus, the ornament member provides an appearance closely resembling that of an actual woven cloth. The plural longitudinal or lateral convex ridges and/or the longitudinal or lateral concave grooves are formed on such a roughened surface of the ornamental portion in such a way as to extend along the longitudinal or lateral direction thereof. These longitudinal or lateral convex ridges and/or the longitudinal or lateral concave grooves are interrupted or deformed due to the interference by the concave portions and/or the projection portions, because of which the surface of the ornamental portion is formed into the roughened surface. The monotonous linearity of the longitudinal or lateral convex ridge and/or the longitudinal or lateral concave groove is changed, so that a surface pattern having fine ups and downs is formed. Consequently, the surface of the ornamental portion provides an appearance closely resembling that of a woven cloth, so that the decorativeness thereof is enhanced. Also, the ornamental portion, whose surface providing an appearance, which closely resembles that of a woven cloth, is formed integrally with the attaching portion.

Further, according to a third aspect of the invention, in the member according to the first or second aspect, the surface of the ornamental portion is provided with at least one of the convex ridges and concave grooves which extend along the longitudinal direction, and at least one of the convex ridges and concave grooves which extend along the lateral direction.

In addition to the advantages and effects of the first or second aspect of the invention, the third aspect has the following advantages and effects. The lateral convex ridges and/or the lateral concave grooves are formed and intersect with the longitudinal convex ridges and/or the longitudinal convex grooves. Thus, a pattern constituted by quadrangles is formed continuously in the longitudinal direction and/or in the direction of width. Consequently, a pattern, which resembles a cross pattern woven in a cloth, is formed in the surface thereof. The decorativeness thereof is enhanced still more.

Furthermore, according to a forth aspect of the invention, in the member according to one of the first to third aspects, the plural longitudinal convex ridges and/or the plural longitudinal concave grooves are formed at an interval that is in a range of 0.1 mm to 5 mm.

In addition to the advantages and effects of one of the first to third aspects of the invention, the fourth aspect has the following advantages and effects. That is, in a case where the interval at which the longitudinal convex ridges and/or the longitudinal concave grooves are formed, is within the aforementioned range, the ornament portion has an appearance, which closely resembles that of an actual woven cloth. Thus, the decorativeness thereof is enhanced.

Further, according to a fifth aspect of the invention, in the member according to one of the first to fourth aspects, the plural longitudinal convex ridges or the plural longitudinal concave grooves are formed in a manner that a projection height of the plural longitudinal convex ridges or a depth of the plural longitudinal concave grooves is in a range of 0.1 mm to 2 mm.

In addition to the advantages and effects of one of the first to fourth aspects of the invention, the fifth aspect has the following advantages and effects. That is, in a case where the projection height of the longitudinal convex ridges or the depth of the longitudinal concave grooves is within the aforementioned range, the ornament portion has an appearance, which closely resembles that of an actual woven cloth. Thus, the decorativeness thereof is enhanced.

Furthermore, according to a sixth aspect of the invention, in the member according to one of the first to fifth aspects, the plural lateral convex ridges or the plural lateral concave grooves are formed at an interval that is in a range of 0.1 mm to 5 mm. According to the sixth aspect, the interval, at which the lateral convex ridges or the lateral concave grooves are formed, is set to be within the aforementioned range, so that the appearance of the surface of the ornamental portion is made to more closely resemble the appearance of an actual woven cloth. Consequently, the decorativeness thereof is enhanced still more.

Further, according to a seventh aspect of the invention, in the member according to one of the first to sixth aspects, the plural lateral convex ridges or the plural lateral concave grooves are formed in a manner that a projection height of the plural lateral convex ridges or a depth of the plural lateral concave grooves is in a range of 0.1 mm to 2 mm. According to the seventh aspect, the projection height of the lateral convex ridge or the depth of the lateral groove, in addition to the projection height of the longitudinal convex ridge and/or the presence of the longitudinal concave groove, are set to be within the aforementioned range. Thus, the appearance of the surface of the ornamental portion is made to more closely resemble the appearance of an actual woven cloth. Consequently, the decorativeness thereof is enhanced still more.

Furthermore, according to an eighth aspect of the invention, in the member according to one of the first to seventh aspects, the ornamental portion is formed in a layer on the surface of the attaching portion. Thus, the ornamental portion can be formed in such a way as to be thin, so that the extrusion molding of the member can be easily conducted.

Furthermore, according to a ninth aspect of the invention, in the member according to one of the first to eighth aspects, a depth of the concave groove in the ornamental portion is limited within a thickness of the ornamental portion. Thus, the ground color of the attaching portion is not exposed. The entire ornamental portion can provide an appearance closely resembling that of an actual woven cloth.

Further, according to a tenth aspect of the invention, in the member according to one of the first to ninth aspects, the concave grooves in the ornamental portion have V-shaped cross section. Thus, the visibility of the concave grooves in the surface of the ornamental portion is high, so that the appearance of the surface of the ornamental portion can be provided in such a way as to be close to that of an actual woven cloth.

Furthermore, according to an eleventh aspect of the invention, in the member according to one of the first to tenth aspects, the ornamental portion has a color differing from that of the attaching portion. Thus, the color of the ornamental portion can be set to be an optimum color, regardless of the ground color of the attaching portion.

Furthermore, according to a twelfth aspect of the invention, in the member according to the eleventh aspect, the ornamental portion has a color being lighter than that of the attaching portion. Thus, the concave grooves and the convex ridges are clearly visually noticed.

Further, according to a thirteenth aspect of the invention, in the member according to one of the first to twelfth aspects, the convex ridges and/or concave grooves of the ornamental portion are each formed like a straight line. Thus, the convex ridges and/or the concave grooves can be set in such a manner as to be similar in shape to those of an actual woven cloth.

Furthermore, according to a fourteenth aspect of the invention, in the member according to one of the first to twelfth aspects, the convex ridges and/or concave grooves of the ornamental portion are each formed like a curved line. Thus, a surface pattern, which is more conspicuous than that of an actual woven cloth, can be formed on the surface of the ornamental portion.

Further, according to a fifteenth aspect of the invention, in the member according to one of the first to fourteenth aspects, a surface modified layer that enhances at least one of wear-resistance and weather-resistance is formed on the surface of the ornamental portion. Thus, even when used for a long time, the surface of the ornamental portion can be maintained so that the appearance thereof closely resembles the appearance of an actual woven cloth.

Furthermore, according to a sixteenth aspect of the invention, in the member according to the fifteenth aspect, the surface modified layer is a transparent layer through which the surface of the ornamental portion is visible. Thus, even when used for a long time, the surface of the ornamental portion can be maintained so that the appearance thereof closely resembles the appearance of an actual woven cloth. Additionally, the surface color of the ornament color can be recognized almost just as it is.

Further, according to a seventeenth aspect of the invention, in the member according to the fifteenth or sixteenth aspect, the modified layer is a silicone resin coat. Thus, in addition to the advantages and effects of the fifteenth or sixteenth aspect, the wear-resistance and the weather-resistance of the member can be enhanced still more.

Furthermore, according to an eighteenth aspect of the invention, in the member according to one of the first to seventeenth aspects, the long ornament member is a vehicle weather strip. The weather strip is attached to a predetermined part of a vehicle in such a way as to be in a state in which the weather strip is exposed to the visible outside. Thus, the decorating effect of the member can be enhanced by forming the ornamental portion integrally with the surface of the attaching portion.

Further, according to a nineteenth aspect of the invention, in the member according to the eighteenth aspect, the weather strip is a door opening trim. The door opening trim is attached along a door opening edge of the body of the vehicle and exposed each time a door is opened. Thus, the decorating effect of the weather strip can be enhanced by forming the ornamental portion integrally with the surface of the attaching portion.

Further, according to a twentieth aspect of the invention, in the member according to the nineteenth aspect, the door opening trim has a concealing lip and the ornamental portion is integrally formed on a surface of the concealing lip and/or a vehicle interior side surface of the attaching portion.

Further, according to a twenty-first aspect of the invention, in the member according to the eighteenth aspect, the weather strip has a hollow seal portion, and the ornamental portion is integrally formed on a surface of the hollow seal portion. Because substantially the entire hollow seal portion of the door opening trim is noticed each time when the door is opened, the decorativeness of the door opening trim at the time of opening the door can be enhanced by forming the ornamental portion integrally with the surface of the hollow seal portion.

Furthermore, according to a twenty-second aspect of the invention, in the member according to the eighteenth aspect, the weather strip is a trunk seal trim. Because substantially the entire trunk seal trim is exposed each time when the trunk lid is opened, the appearance of a trunk seal part at the time of opening the lid of the trunk room can be improved by forming the ornamental portion integrally with the surface of the hollow seal portion.

Further, according to a twenty-third aspect of the invention, in the member according to the twenty-second aspect, the trunk seal trim has a concealing lip and the ornamental portion is integrally formed on a surface of the concealing lip and/or a vehicle interior side surface of the attaching portion. Because the concealing lip of the trunk seal trim is used for concealing a terminal portion of equipment like a carpet in the trunk room, the decorativeness of apart extending from the trunk seal trim to the equipment in the trunk room can be enhanced by forming the ornament portion integrally formed with the concealing lip and/or the vehicle interior side surface of the attaching portion.

Further, according to a twenty-fourth aspect of the invention, in the member according to one of the eighteenth to twenty-third aspects, the whether strip further has a metal core.

Furthermore, according to a twenty-fifth aspect of the invention, there is provided a method of manufacturing a long ornament member having an attaching portion being attachable to a body to be attached and an ornamental portion made of a vulcanized rubber integrally formed on a surface of the attaching portion, the method including the steps of: integrating a predetermined attaching-portion forming part made of an unvulcanized rubber mixed with an vulcanizing agent and a predetermined ornamental-portion forming part made of an unvulcanized rubber mixed with a vulcanizing agent and a plurality of fine thermo-expandable microcapsules and extruding an integrated part from a rubber extrusion die in a state in which at least one of plural longitudinal concave grooves and longitudinal convex ridges continuously extending in parallel on a surface of the predetermined ornamental-portion forming part are formed, the rubber extrusion die having an orifice whose shape corresponds to that of a cross section of the long ornament member and having at least one of projections and recesses formed on an inner surface of an ornamental portion extrusion part of the orifice of the rubber extrusion die; heating the predetermined ornamental-portion forming part and forming a plurality of outwardly opened concave portions on a surface of the predetermined ornamental-portion forming part by expanding at least a part of the microcapsules on or in the vicinity of a surface in such a way as to exceed a limit and burst, and expanding the microcapsules provided in the vicinity of the surface of the predetermined ornamental-portion forming part to form a plurality of projection portions swelling outwardly, so that at least one of the longitudinal concave grooves and longitudinal convex ridges of the predetermined ornamental-portion forming part are interrupted or deformed at irregular positions in the longitudinal direction; and changing the unvulcanized rubber of the predetermined ornamental-portion forming part and the predetermined attaching-portion forming part into a vulcanized rubber having rubber-like elasticity by vulcanizing through the heating of the predetermined ornamental-portion forming part.

According to the twenty-fifth aspect of the invention, in the step of extruding the predetermined ornamental-portion forming part form the ornamental portion extrusion part of the orifice of the rubber extrusion die, the plural longitudinal concave grooves and/or the longitudinal convex ridges continuously extending in the longitudinal direction are formed in the surface of the predetermined ornamental-portion forming part by the projections and/or the recesses formed on the inner surface of the ornamental portion extrusion part of the extrusion die. Also, in the step of heating the predetermined ornamental-portion forming part, the many concave portions and/or the projection portions are formed in the predetermined ornamental-portion forming part due to the expansion and burst, and the expansion and projection of the microcapsules provided in the surface layer. Such concave portions and/or the projection portions break and/or deform the longitudinal concave grooves and/or the longitudinal convex ridges. Thus, a long ornament member having an ornamental portion, which provides an appearance closely resembling that of an actual woven cloth, can easily and continuously be formed from the extrusion die.

Further, according to a twenty-sixth aspect of the invention, there is provided a method of manufacturing a long ornament member having an attaching portion being attachable to a body to be attached and an ornamental portion made of a vulcanized rubber integrally formed on a surface of the attaching portion, the method including the steps of: extruding a predetermined attaching-portion forming part made of an unvulcanized rubber mixed with a vulcanizing agent and a predetermined ornamental-portion forming part made of an unvulcanized rubber mixed with a vulcanizing agent and a plurality of fine thermo-expandable microcapsules from a rubber extrusion die having an orifice whose shape corresponds to that of a cross section of the long ornament member; forming at least one of plural longitudinal convex ridges and longitudinal concave grooves continuously extending in parallel on a surface of the extruded predetermined ornamental-portion forming part; heating the predetermined ornamental-portion forming part and forming a plurality of outwardly opened concave portions on a surface of the predetermined ornamental-portion forming part by expanding at least a part of the microcapsules on or in the vicinity of a surface in such a way as to exceed a limit and burst, and expanding the microcapsules provided in the vicinity of the surface of the predetermined ornamental-portion forming part to form a plurality of projection portions swelling outwardly, so that at least one of the longitudinal concave grooves and longitudinal convex ridges are interrupted or deformed at irregular positions in the longitudinal direction; and changing the unvulcanized rubber of the predetermined ornamental-portion forming part and the predetermined attaching-portion forming part into a vulcanized rubber having rubber-like elasticity by vulcanizing through the heating of the predetermined ornamental-portion forming part.

According to the twenty-sixth aspect, the step of forming the plural longitudinal convex ridges and/or the concave grooves, which extend continuously in the longitudinal direction in parallel with one another, in the surface of the predetermined ornamental-portion forming part can be performed after the predetermined ornamental-portion forming part is extruded from the rubber extrusion die. Thus, the convex ridges and/or the concave grooves can freely be formed in such a way as to extend in a direction intersecting with the longitudinal direction.

Furthermore, according to a twenty-seventh aspect of the invention, in the method according to the twenty-fifth or twenty-sixth aspect, before completion of vulcanizing of the predetermined ornamental-portion forming part, plural lateral convex ridges and/or lateral concave grooves are formed in such a way as to extend in a direction, in which the plural lateral convex ridges and/or lateral concave grooves intersect with the longitudinal convex ridges and/or longitudinal concave grooves, to thereby form a pattern that is constituted by many quadrangles each enclosed by the longitudinal and lateral convex ridges and/or the longitudinal and lateral concave grooves.

In addition to the advantages and effects of the twenty-fifth or twenty-sixth aspect, the twenty-seventh aspect of the invention has the following advantages and effects. That is, a pattern constituted by many quadrangles is continuously formed in the surface of the ornamental portion, in addition to the pattern constituted mainly by the longitudinal convex ridges and/or the concave grooves, which are interrupted and deformed. Thus, an ornament member providing an appearance, which is by no means inferior to that of a real woven cloth, can easily be formed.

Further, according to a twenty-eighth aspect of the invention, in the method according to one of the twenty-fifth to twenty-seventh aspect, the predetermined ornamental-portion forming part is extruded in a state in which the microcapsules are not burst. Because the many microcapsules provided in the predetermined ornamental-portion forming part partly burst during a state in which no pressure acts on the surfaces thereof after the extrusion, so that an uneven pattern is formed on the surface of the ornamental portion, the uneven pattern can easily be formed on the surface of the ornamental portion.

Furthermore, according to a twenty-ninth aspect of the invention, in the method according to one of the twenty-fifth to twenty-eighth aspects, when heating the predetermined ornamental-portion forming part, the predetermined ornamental-portion forming part is heated to a temperature sufficient to cause an outer shell of the microcapsule to soften and burst due to a pressure of an internal gas, and the unvulcanized rubber is vulcanized by the heating of the predetermined ornamental-portion forming part. According to the twenty-ninth aspect, the microcapsules burst in an optimal state in which no externally pressure is acted when the unvulcanized rubber is vulcanized, optimum uneven patterns due to the burst of the microcapsules can be formed on the surface of the ornamental portion, simultaneously with the vulcanization of the unvulcanized rubber constituting the ornamental portion.

Further, according to a thirtieth aspect of the invention, in the method according to the twenty-ninth aspect, before completion of vulcanizing the unvulcanized rubber of the predetermined ornamental-portion forming part, at least softening and expansion of the outer shell of the microcapsule are finished. Because the vulcanization is performed after the uneven pattern due to the burst of the microcapsule is formed on the surface of the predetermined ornamental-portion forming part, the expansion and the burst of the microcapsules are not restricted or prevented.

Furthermore, according to a thirty-first aspect of the invention, in the method according to the twenty-ninth or thirtieth aspect, during the predetermined ornamental-portion forming part made of the unvulcanized rubber is heated, at least softening and expansion of the outer shell of the microcapsule are started when the Mooney viscosity of the predetermined ornamental-portion forming part is lowered by the heating than that of the predetermined ornamental-portion forming part before being heated. Thus, the expansion of the microcapsule is facilitated. Consequently, the formation of the uneven pattern due to the microcapsules is facilitated.

Further, according to a thirty-second aspect of the invention, in the method according to one of the twenty-fifth to thirty-first aspects, expansion of microcapsules and volume-expansion of the predetermined ornamental-portion forming part are performed by heating the predetermined ornamental-portion forming part, in the surface of which concave grooves each having a predetermined width are formed, to thereby reduce the width of the concave grooves from the width of the concave grooves before being heated. Thus, the width of the concave grooves finally formed in the surface of the ornamental portion can be narrowed in such a way as to be close to the width of those of an actual woven cloth.

Furthermore, according to a thirty-third aspect of the invention, there is provided a method of manufacturing a long ornament member having an ornamental portion made of a vulcanized rubber, the method including the steps of: extruding the long ornament member with a predetermined ornamental-portion forming part made of an unvulcanized rubber mixed with a vulcanizing agent and a plurality of fine thermo-expandable microcapsules from a rubber extrusion die in a state in which at least one of plural longitudinal concave grooves and longitudinal convex ridges continuously extending in parallel on a surface of the predetermined ornamental-portion forming part are formed, the rubber extrusion die having an orifice whose shape corresponds to that of a cross section of the long ornament member and having at least one of plural projections and recesses formed on an inner surface of an ornamental portion extrusion part of the orifice of the rubber extrusion die; and heating the predetermined ornamental-portion forming part.

Further, according to a thirty-fourth aspect of the invention, there is provided a method of manufacturing a long ornament member having an ornamental portion made of a vulcanized rubber, the method including the steps of: extruding the long ornament member with a predetermined ornamental-portion forming part made of an unvulcanized rubber mixed with a vulcanizing agent and a plurality of fine thermo-expandable microcapsules from a rubber extrusion die having an orifice whose shape corresponds to that of a cross section of the long ornament member; forming at least one of plural longitudinal convex ridges and longitudinal concave grooves continuously extending in parallel on a surface of the extruded predetermined ornamental-portion forming part; and heating the predetermined ornamental-portion forming part.

The long ornament member according to the invention provides an appearance, which is in no way inferior to the appearance of an actual woven cloth, due to the combination of the longitudinal convex ridges and/or the longitudinal concave grooves formed in the ornamental portion, the expansion and burst of the microcapsules mixed and kneaded (or dispersed) in the material of the ornamental portion, and the uneven pattern (or the roughened surface pattern) formed on the surface of the ornamental portion. Consequently, the decorativeness of the member can be considerably enhanced.

The method of manufacturing a long ornament member according to the invention uses one of or the combination of the rubber extrusion die, in which the projections and/or the recesses are formed in the ornamental portion extrusion part (the inner surface of the flow path of the extrusion die) of the orifice thereof, and the roller, in the peripheral surface of which the projections and/or the recesses are formed. According to the method of the invention, preliminarily, the microcapsules are mixed and kneaded (or dispersed) in the material of the ornamental portion. Then, the material is extruded from the orifice and vulcanized. Thus, a long ornament member having a woven-fabric-like surface can easily be formed.

BEST MODES FOR CARRYING OUT THE INVENTION

Figure 1:
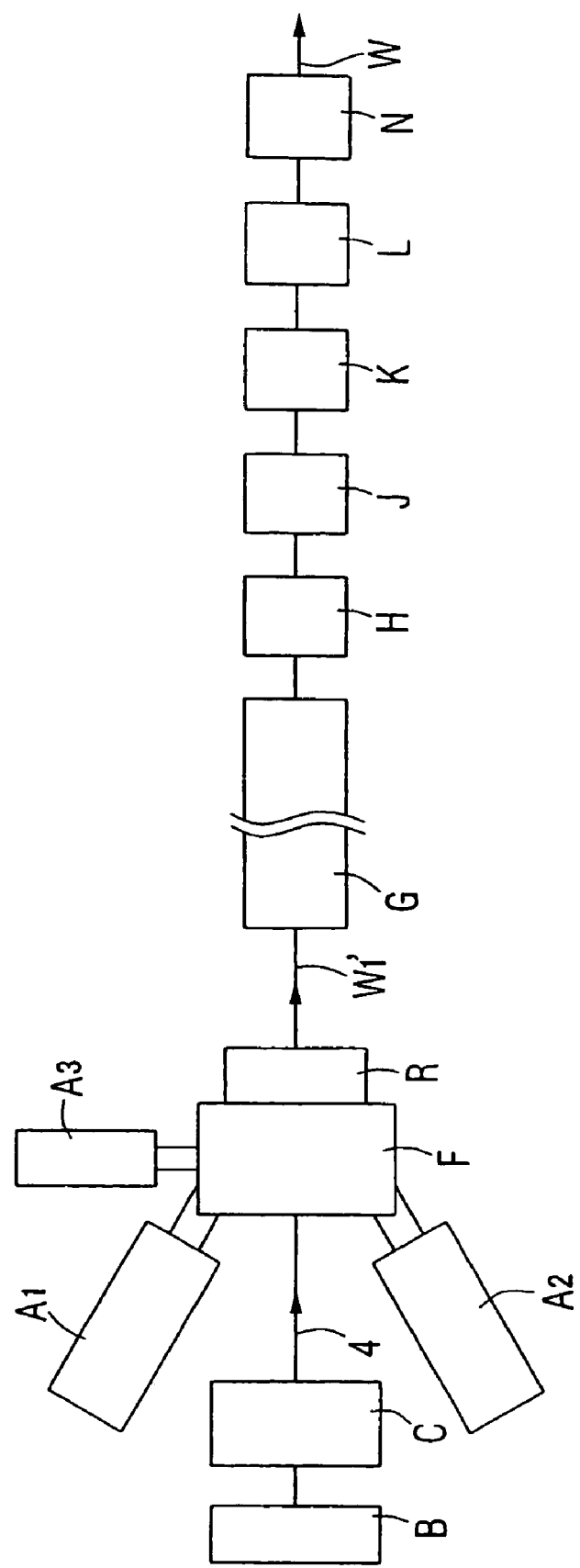
FIG. 1 is a schematic plan arrangement view illustrating a manufacturing apparatus including a rubber extrusion die for carrying out the invention.
Figure 2:
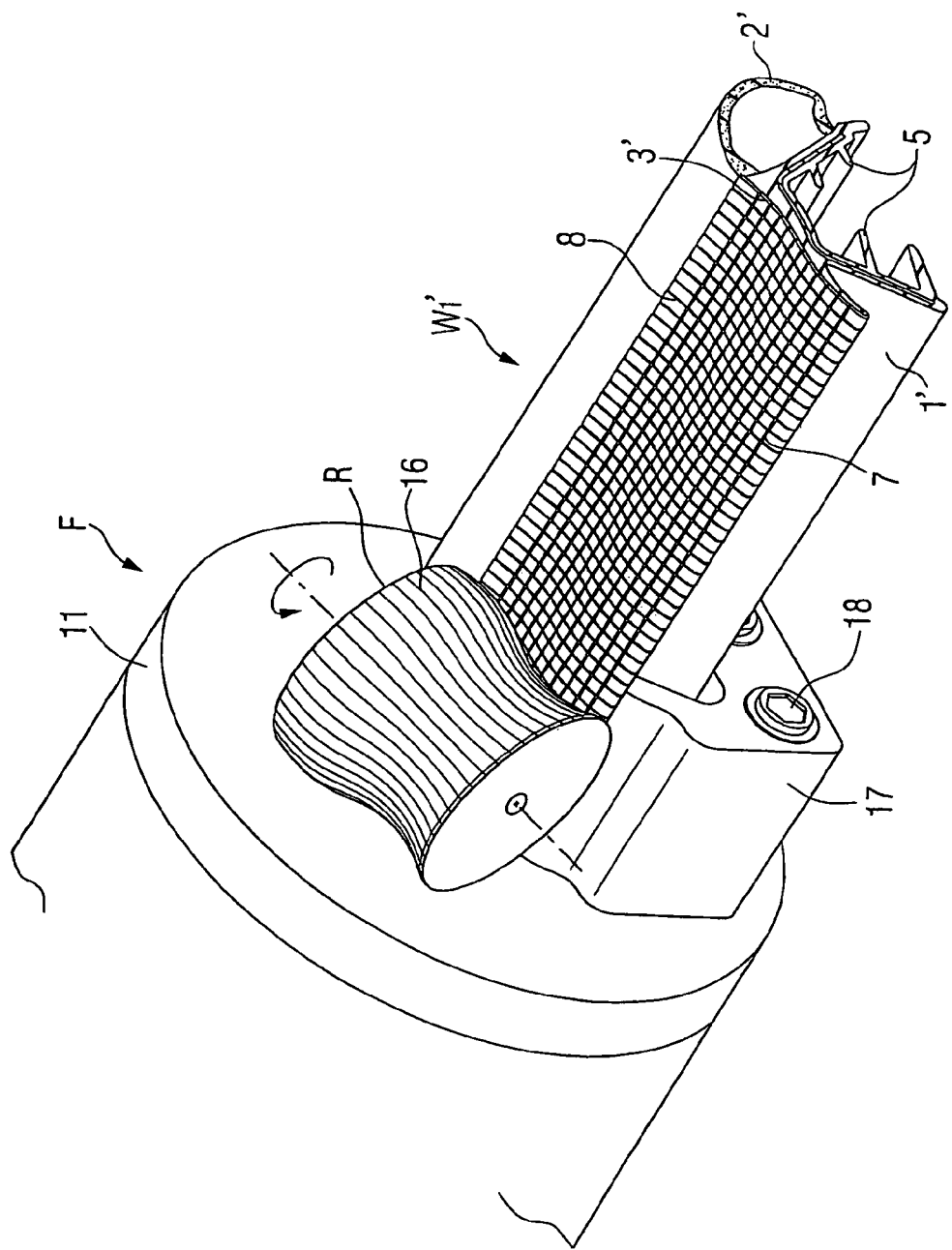
FIG. 2 is a perspective view illustrating an outlet side part of the rubber extrusion die.
Figure 3:
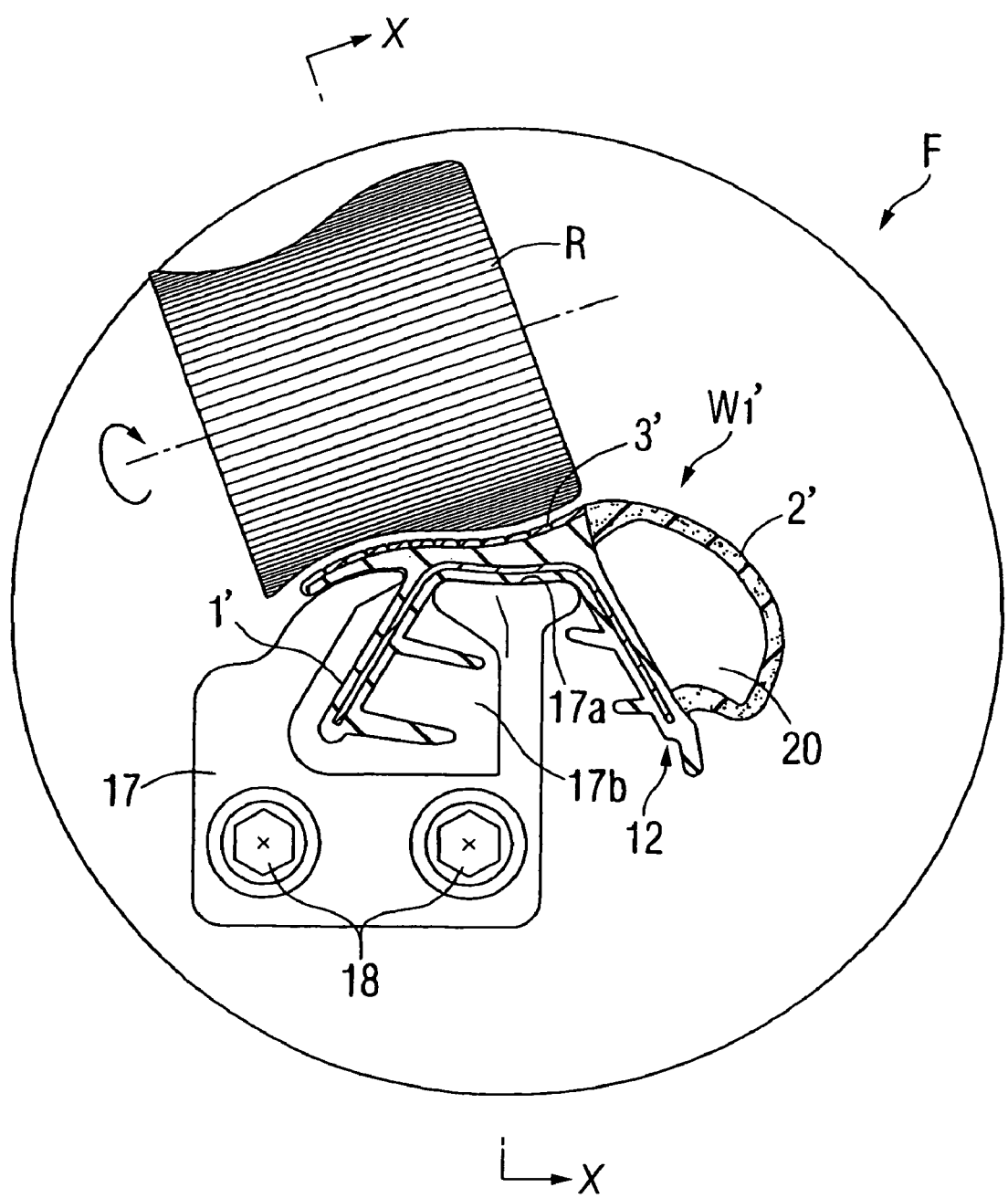
FIG. 3 is an elevational view of the rubber extrusion die viewed from a downstream side thereof.
Figure 4:
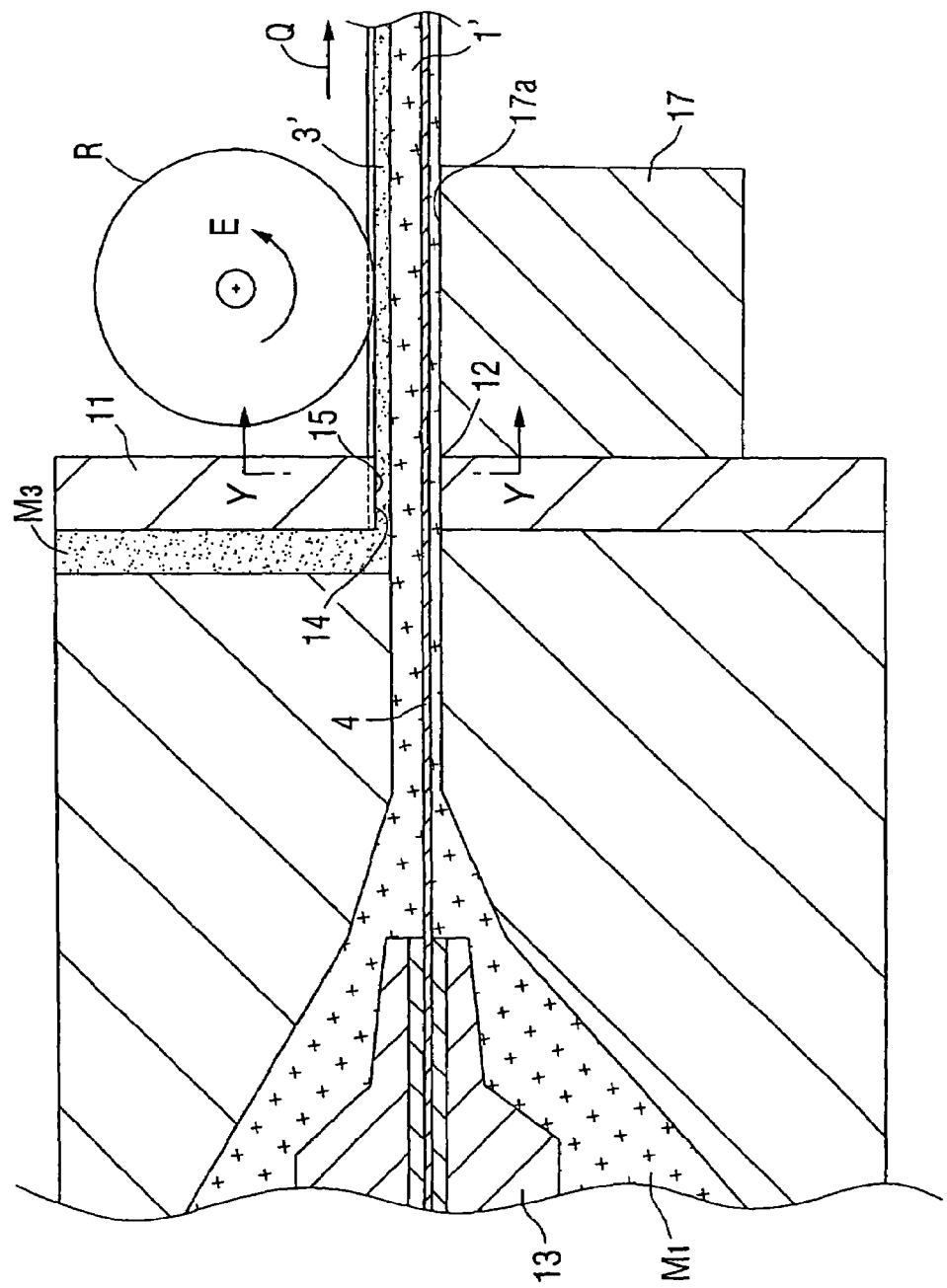
FIG. 4 is a cross-sectional view taken along line X-X in FIG. 3.

Hereinafter, the invention is described in detail with reference to a best mode for carrying out the invention and other modes. FIG. 1 is a schematic plan arrangement view illustrating a manufacturing apparatus including a rubber extrusion die F for carrying out the invention. FIG. 2 is a perspective view illustrating an outlet side part of the rubber extrusion die F. FIG. 3 is an elevational view viewed from the downstream side thereof. FIG. 4 is a cross-sectional view taken along line X-X in FIG. 3. First, a weather strip $W_1$ will be described, and then an apparatus and a method of manufacturing the weather strip $W_1$ will be described. Incidentally, in the case of describing the method of manufacturing the weather strip $W_1$, the terms "predetermined attaching-portion forming part 1'," "predetermined seal-portion forming part 2'," and "predetermined ornamental-portion forming part 3'" are sometimes used in the process of molding for describing an attaching portion 1, a seal portion 2, and an ornamental portion 3 of the weather strip $W_1$ as parts of the weather strip $W_1$, respectively.

Figure 13:
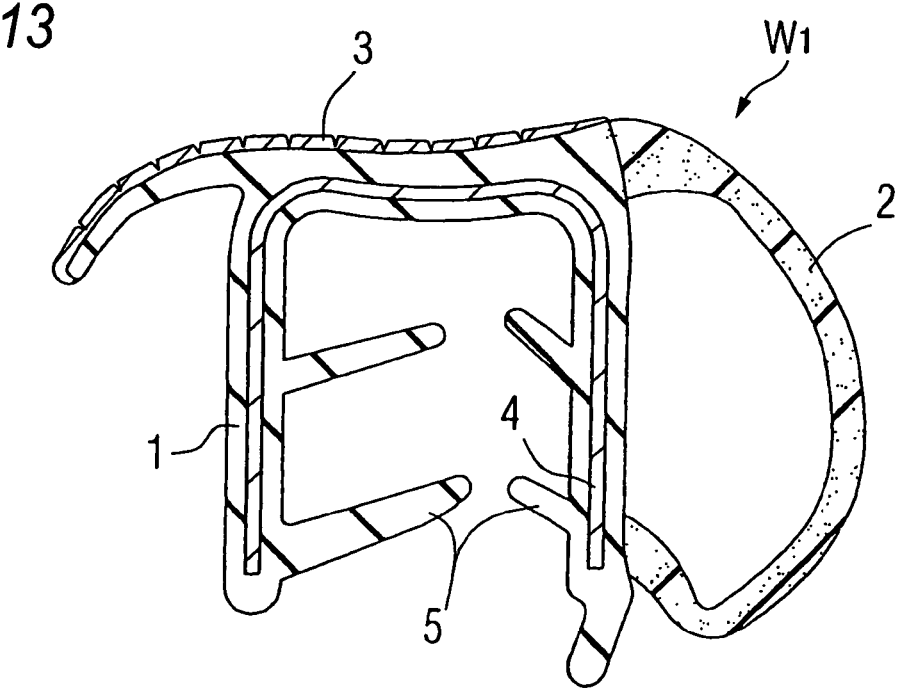
FIG. 13 is a cross-sectional view illustrating the weather strip in a state after the attaching portion is folded.

As shown in FIG. 13, the weather strip $W_1$, which is a completed product, serves as a door opening trim, which is attached along a circumferential edge portion of a door opening of a vehicle body of an automobile, for sealing between the door opening and the door. The weather strip $W_1$ is an elongated element in which the hollow seal portion 2 is integrally formed with the cross-sectionally U-shaped attaching portion 1, and in which the ornamental portion 3 is formed in a layer on the surface of the attaching portion 1. A reinforcing metal core 4 constituted by a sheet metal strip is embedded in the attaching portion 1. Plural gripping lips 5 each for gripping a flange of the body to be attached (not shown) by gripping are formed on the opposed inner surfaces of the attaching portion 1 in such away as to protrude therefrom. Preferably, the attaching portion 1 is molded by using kneaded and vulcanized EPDM (an ethylene-propylene-diene terpolymer), into which 20% to 40% carbon black by mass is mixed. Preferably, the hollow seal portion 2 is made of a rubber material (for instance, kneaded sponge EPDM, into which 20% to 40% carbon black by mass is mixed (before foamed)), which is softer than the vulcanized EPDM of the attaching portion 1 and excels in elastic deformation. The ornamental portion 3 is vulcanized after unvulcanized and kneaded rubber, into which a vulcanizing agent and many fine expansive microcapsules 6 are mixed, is extruded. The ornamental portion 3 of the completed weather strip $W_1$ contains many expanded microcapsules and many microcapsules burst after expanded in the surface thereof.

For the viewpoint of enhancing the decorativeness of the ornamental portion 3, preferably, the rubber constituting the ornamental portion 3 may be EPDM, CSM, CPE, or silicone rubber, which is colored in color different from the color of the attaching portion. It is especially preferable that such rubber is colored in color being lighter than the color of the attaching portion, and that the color of the rubber is harmonious with the color of the vehicle interior component. The rubber material of the ornamental portion 3 may include various kinds of materials, in view of the decorativeness thereof. Such kinds of materials are, for example, particulate elements or flaky elements giving a desired color to the ornamental portion 3, particulate or flaky metallic materials enabled to provide a metallic appearance, particulate or flaky inorganic materials enabled to provide a sandy or mortar appearance, and textile materials enabled to provide a textile appearance. Also, various kinds of coloring materials (pigments) may be provided so as to color the ornament portion 3.

The shapes of the microcapsules (see FIGS. 9 to 11) are not limited to a specific one. The microcapsule may take various shapes, such as a spindle-shape, a substantially spherical shape, an indeterminate shape, and a cylinder shape. However, in view of the dispersibility and the design effects of the microcapsules, preferably, the shapes of the microcapsules are substantially spherical. The outside diameters (that is, the maximum outside diameter sizes) of the dispersed microcapsules 6 may be nearly equal to one another. However, preferably, the microcapsules 6 have two or more kinds of outside diameters. More preferably, the microcapsules 6 have many kinds of outside diameters, because the combination of the microcapsules, which have many kinds of outside diameters, and a woven fabric-like pattern (to be described later) on the surface of the ornamental portion 3 achieves various design effects. Moreover, preferably, the outside diameter of the microcapsule 6 is equal to or more than from 10 μm and equal to or less than 500 μm. More preferably, the outside diameter of the microcapsule 6 is equal to or more than from 50 μm and equal to or less than 300 μm.

Basically, the material of the outer shell of the microcapsule 6 needs to have thermal properties differing from those of the material of the ornamental portion 3. In this embodiment, the ornamental portion 3 of the weather strip $W_1$ is usually molded by extruding unvulcanized clayey rubber material at a temperature of 50° C. to 90° C. Thus, it is necessary that the material of the outer shell of the microcapsule 6 has a softening temperature that is higher than the kneading temperature of the material of the ornamental portion 3. The materials of the outer shell are, for example, thermoplastic resins, such as polyvinylidene chloride, vinylidene chloride-acrylonitrile copolymer, polyacrylonitrile, acrylonitrile-based copolymer, and polyvinylchloride. A gas involved in the microcapsule 6 is not limited to a specific gas. However, the gas may be low-boiling-temperature carbon hydride, such as n-pentane, n-hexane, n-butane, iso-butane, and iso-pentane. Alternatively, the liquid gas may be air, carbon dioxide, or inert gases, such as a nitrogen gas and an argon gas.

The microcapsules 6 mixed and kneaded in the materials of the ornamental portion 3 has a thermo-expandable outer shell that is thermoplastic and softens and becomes expandable during being heated. The outer shell softens at a predetermined heating temperature, and the involved gas is volume-expanded. This is followed by the microcapsules that finally swell outwardly in the vicinity of the surface of the ornamental portion 3. The outer shell of the ornamental portion 3 exceeds expansion limit and bursts in the vicinity of the surface of the ornamental portion 3. Then, concave portions 6a, which are outwardly opened, are formed therein (see FIGS. 9 to 11). Thus, fine uneven patterns are shaped on the surface of the ornamental portion 3. According to this embodiment, when the weather strip $W_1$, which is in the process of vulcanizing, is heated, the outer shells of the microcapsules 6 are heated by heat given for vulcanizing the unvulcanized rubber. Thus, the outer shell thereof is softened and swelled and burst, as described above. That is, in the case that the predetermined ornamental-portion forming part 3' made of unvulcanized rubber is heated, and that the Mooney viscosity of the predetermined ornamental-portion forming part 3' is lowered by the heating, as compared with that measured before being heated, at least the softening and the expansion of the outer shells of the microcapsules are started. Some of the outer shells, which are not covered by the surrounding material, are heated up to a temperature at which the outer shells are burst by the increased internal pressure of the gas. Then, at least the softening and the expansion of the outer shells of the microcapsules are finished before the vulcanization of the unvulcanized rubber of the predetermined ornamental-portion forming part 3' is completed. Thus, it is necessary for the preferred microcapsules 6 of this embodiment that an explosion temperature thereof, which is sufficient for causing the outer shell to soften, melt, and explode, is higher than an extrusion molding temperature of the material $M_3$ of the predetermined ornamental-portion forming part 3' extruded from the rubber extrusion die F (to be described later) and is lower than a vulcanizing temperature of the material $M_3$ (it is preferable that the outer shell of the microcapsule 6 does not burst when the predetermined ornamental-portion forming part 3' is extruded, and that the outer shell thereof is burst and/or expanded when the vulcanization thereof is performed by being heated). Concretely, the outer shell of the microcapsule 6 starts to soften and expand at a temperature of about 120° C. Preferably, the explosion temperature thereof is equal to or higher than 150° C. and equal to or lower than 200° C. Incidentally, for example, EXPANCEL Microsphere (sold by Japan Ferrite Co., Ltd.) and Matsumoto Microsphere (sold by Matsumoto Yushi Co., Ltd.) can be used as such a thermo-expandable microcapsule. Preferably, the compounding ratio of the microcapsules 6 to the material of the ornamental portion 3 by mass is equal to or more than 0.1% by mass and equal to or less than 5% by mass.

As shown in FIGS. 1 to 4, an end plate 11 is included in the rubber extrusion die F. In the end plate 11, an orifice (or extrusion opening) 12, whose shape corresponds to that of a cross section of the weather strip $W_1'$, which is in the process of molding, is formed. Material extruders $A_1$, $A_2$, and $A_3$ for extruding materials, which are used for forming the predetermined attaching-portion forming part 1', the predetermined seal-portion forming part 2', and the predetermined ornamental-portion forming part 3' of the weather strip $W_1'$, are connected to the rubber extrusion die F (see FIG. 1). The materials are supplied from different parts of the rubber extrusion die F to inner material paths separated from one another. Then, the materials join together at an upstream side part of the orifice 12. Thus, the weather strip $W_1'$ is extruded from the orifice 12. A metal core 4 to be embedded in the predetermined attaching-portion forming part 1' is drawn out of a metal core supply uncoiler B. Subsequently, the metal core 4 is roll-formed by a metal core roll-forming machine C in such a way as to have a roughly reversed-V-shaped cross section. Then, the roll-formed metal core 4 is supplied into the rubber extrusion die F, and guided by a metal core guide 13 provided therein, so that the metal core 4 is integrally embedded in the predetermined attaching-portion forming part 1' in the rubber extrusion die F. Incidentally, in FIG. 4, reference characters $M_1$ and $M_3$ designate materials that are present in the molding die F and respectively used for forming the predetermined attaching-portion forming part 1' and the predetermined ornamental-portion forming part 3'. The material for forming the predetermined seal-portion forming part 2' is not shown in this figure. Moreover, in FIG. 3, reference numeral 20 denotes a part of a molding die that is a central core mold, which is disposed in the orifice 12, for forming the predetermined hollow seal-portion forming part 2' in such a way as to be hollow.

Figure 5:
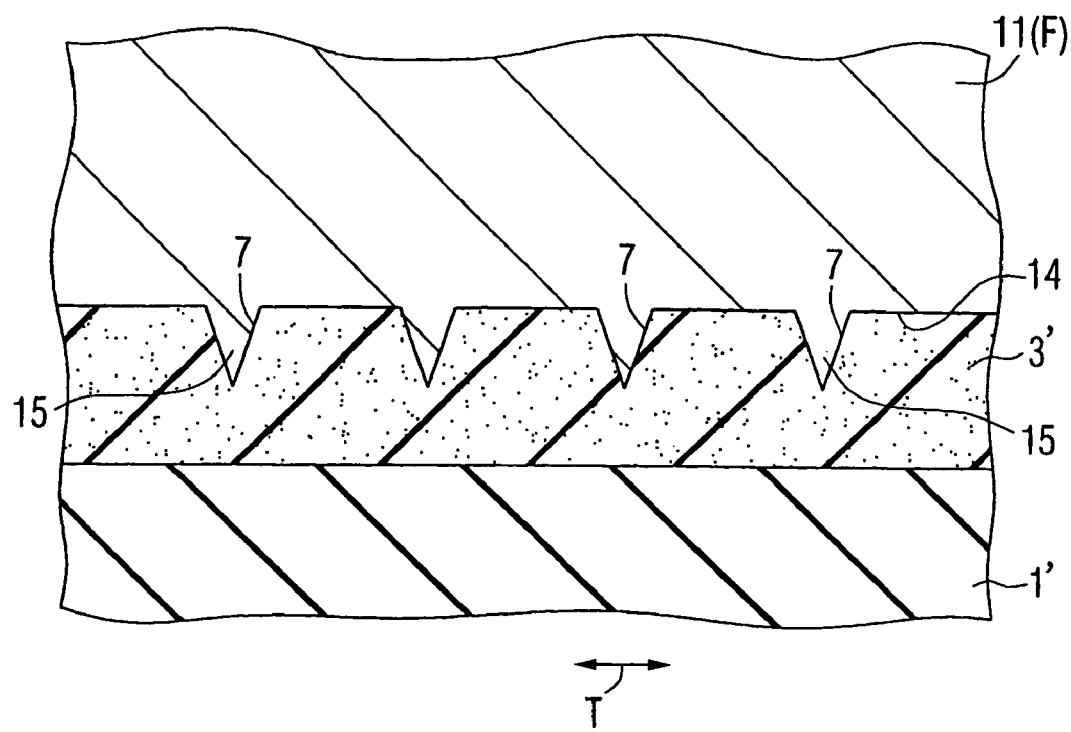
FIG. 5 is a schematic cross-sectional view (taken along line Y-Y in FIG. 4) illustrating that longitudinal convex grooves are formed in a surface of a predetermined ornamental-portion forming part by die projections formed along an extrusion direction (a direction perpendicular to a surface of the sheet of FIG. 5) in an extrusion surface (an inner wall surface of a flow path) of an orifice in an end plate of the extrusion die.
Figure 6:
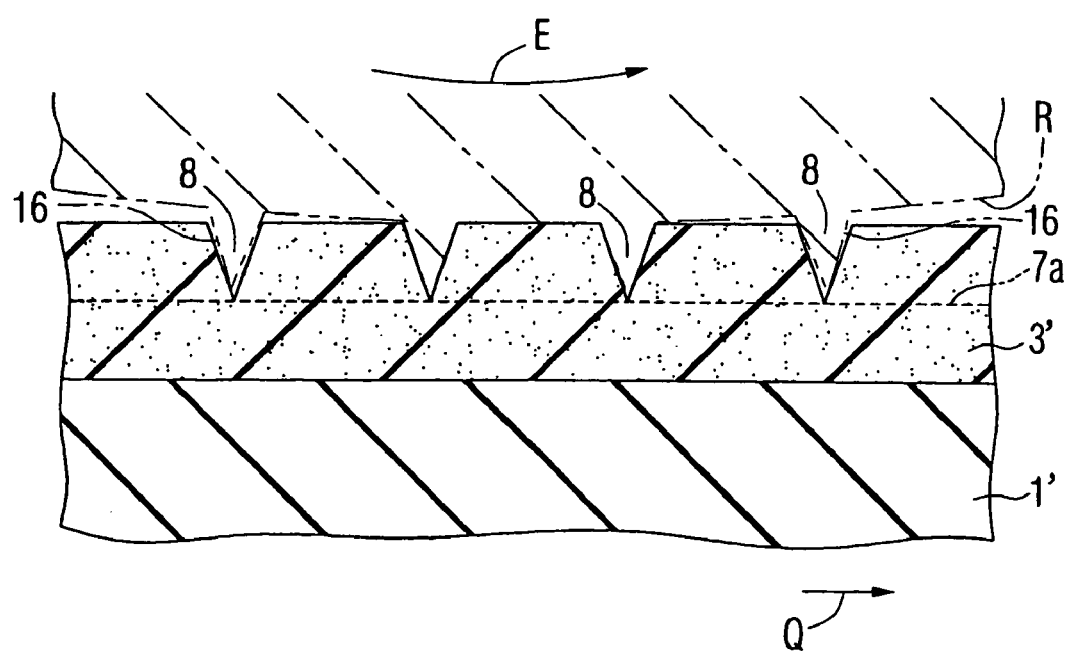
FIG. 6 is a schematic cross-sectional view illustrating that a lateral concave groove is formed in a surface of the predetermined ornamental-portion forming part by a lateral concave groove providing roller.

FIG. 5 is a schematic cross-sectional view (a schematic cross-sectional view taken along line Y-Y in FIG. 4) illustrating that longitudinal convex grooves 7 are formed in a surface of a predetermined ornamental-portion forming part 3' by die projections 15 formed along an extrusion direction (a direction perpendicular to a surface of the sheet of FIG. 5) in an extrusion surface 14 (an inner wall surface of a flow path) of an orifice 12 in an end plate 11. FIG. 6 is a schematic cross-sectional view illustrating that lateral concave grooves 8 are formed in a surface of the predetermined ornamental-portion forming part 3' by a lateral concave groove providing roller R. As shown in FIGS. 4 and 5, plural cross-sectionally triangularly-shaped die projections 15 for forming cross-sectionally substantially-V-shaped longitudinal concave grooves 7 extending along the longitudinal direction (or an extrusion direction), which are parallel with one another over the entire width of the surface of the predetermined ornamental-portion forming part 3', are formed in the extrusion surface 14 for the predetermined ornamental-portion forming part 3' in the orifice 12 of the end plate 11 of the rubber extrusion die F. The interval of the plural die projections 15 and the projection height thereof are set in such a manner as to respectively correspond to the interval of the plural longitudinal concave grooves 7 and the depth (to be described later) thereof, respectively. Incidentally, the meaning of the term "parallel" includes not only a state, in which two rectilinear lines do not intersect with each other, but also a state in which two curved lines do not intersect with each other.

At the downstream side of the orifice 12 of the rubber extrusion die F, the lateral concave groove providing roller R for forming, just after the extrusion, the lateral concave grooves 8 in the surface of the predetermined ornamental-portion forming part 3' is disposed. Preferably, the roller R is driven and rotated in a direction of an arrow E at a circumferential speed that is equal to the extrusion speed of the weather strip $W_1$, which is extruded from the orifice 12 of the rubber extrusion die F and in the process of extrusion molding. Alternatively, the roller R may be rotated from an idling and non-driven state in such a way as to follow the extrusion of the weather strip $W_1$. The cross sectional shape in an axial direction of the surface of the roller R is set to be gently corrugated shape corresponding to the shape of the surface of the predetermined ornamental-portion forming part 3'. Many roller projections 16 are formed on the outer peripheral surface of the roller R in such a way as to extend in parallel with one another along the axial direction. The interval and the projection height of the many roller projections 16 are almost equal to those of the die projections 15. Incidentally, the interval and the projection height of the roller projections 16 may be different from those of the die projections 15. Further, as shown in FIGS. 2 to 4, a supporting device 17 for supporting a pressing force of the roller R by supporting a part of the predetermined ornamental-portion forming part 3' and the predetermined attaching-portion forming part 1' by sandwiching is disposed just under the lateral concave groove providing roller R. The supporting device 17 is fixed to a front end surface of the end plate 11 through plural fixing bolts 18. The shape of the top surface 17a of the supporting device 17 is the same as that of the bottom surface (the rear surface) of the predetermined attaching-portion forming part 1' provided on the rear surface of the predetermined ornamental-portion forming part 3'. An insertion hole 17b, through which a part of the predetermined attaching-portion forming part 1' can be passed, is formed in the supporting device 17. This insertion hole 17b is opened therein in such a way as to gradually and upwardly decrease the width thereof.

Incidentally, the lateral concave groove providing roller R is pushed by a steel spring or the like (not shown) against the supporting device 17, and driven and rotated in a state in which the roller R pushes the predetermined ornamental-portion forming part 3' by a predetermined pressure. Thus, the roller R is in closely contact with the surface of the predetermined ornament portion forming part 3'. In FIG. 3, both the roller R and the part 3' are separated as a matter of convenience. Further, to form the longitudinal concave grooves 7, the extrusion surface 14 of the orifice 12 is formed in such a manner as to be gently corrugated and as to correspond to the shape of the cross section of the ornamental portion 3 to be formed. The plural projections 15 are provided on the extrusion surface 14 having such a cross sectional shape. As a matter of convenience, FIG. 5 schematically illustrates this state in a linear manner. Additionally, as will be described later, the intervals of the longitudinal and lateral concave grooves 7 and 8 and the die projections 15, 15, 15 and the roller projections 16, 16, 16 for forming the concave grooves 7 and 8, which are formed in the surface of the predetermined ornamental-portion forming part 3', range from 0.1 mm to 5 mm. In FIGS. 2, 3, 5, 6 and 15, the intervals are shown in such a way as to be larger than actual intervals as a matter of convenience.

Next, the method of manufacturing the weather strip $W_1'$ of the aforementioned configuration by using the rubber extrusion die F of the aforementioned constitution is described. As shown in FIGS. 1 to 4, different materials (that is, the EPDM material used for forming the predetermined ornamental-portion forming part 3' and obtained by kneading the microcapsules and the vulcanizing agent and other additives, the EPDM material used for forming the predetermined attaching-portion forming part 1' and obtained by kneading the 20% to 40% carbon black by mass and the vulcanizing agent, and the EPDM material used for forming the predetermined hollow seal portion and obtained by kneading the 20% to 40% carbon black by mass, the vulcanizing agent, and a foaming agent) are supplied from the material extruders $A_1$, $A_2$, and $A_3$ to different material paths separated from one another in the rubber extrusion die F. The three different kinds of materials join together at the front side (the upstream side) of the end plate 11 and then are extruded from the orifice 12 as the weather strip $W_1'$, which is in the process of extrusion. The unvulcanized rubber material, which is obtained by kneading the vulcanizing agent and the many fine expansive microcapsules 6 therein, is extruded from the orifice 12, so that the predetermined ornamental-portion forming part 3' is formed in a layer on the surface of the predetermined attaching-portion forming part 1' in such a way as to be integral therewith. Further, the rubber material constituting the predetermined ornamental-portion forming part 3' is extruded from the orifice 12 in a state in which as shown in FIGS. 4 and 5, the plural substantially-V-shaped longitudinal concave grooves 7 are simultaneously formed on the surface of the predetermined ornamental-portion forming part 3' in such a way as to be parallel to one another by the plural die projections 15 formed on the extrusion surface 14 of the orifice 12. According to the invention, the weather strip $W_1'$, in which only the longitudinal concave grooves 7 (or only the longitudinal convex ridges 9 (to be described later)) are formed, may supplied for the next vulcanizing process. However, according to this embodiment, patterns, which more closely resemble that of an actual woven cloth, are formed, by forming the lateral concave grooves 8 using the lateral concave groove providing roller R, which will be described herein.

Figure 7:
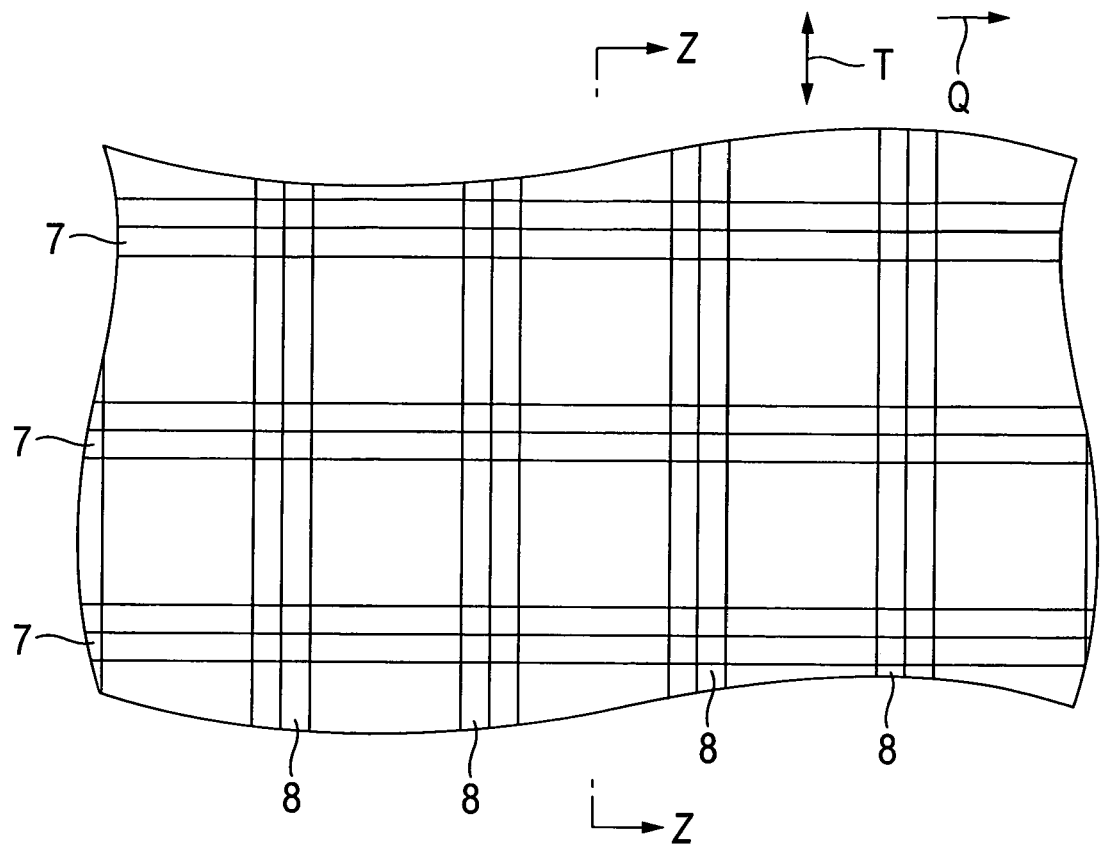
FIG. 7 is a partly enlarged plan view illustrating the predetermined ornamental-portion forming part of a weather strip.

The predetermined ornamental-portion forming part 3' of the weather strip $W_1'$, which is in the process of molding, is extruded in a state, in which the plural longitudinal concave grooves 7 are formed in the surface thereof, from the orifice 12. Just after extrusion, the predetermined ornamental-portion forming part 3' is sandwiched by the top surface 17a of the supporting device 17 and the lateral concave groove providing roller R disposed just above the top surface 17a and thus pushed against the top surface 17a of the supporting device 17 by a downward pushing force of the lateral concave groove providing roller R. The lateral concave groove providing roller R is driven and rotated at a circumferential speed, which is equal to the extrusion speed in the extrusion direction Q of the weather strip $W_1'$, which is in the process of molding. Therefore, in the surface of the predetermined ornamental-portion forming part 3', other lateral concave grooves 8 are formed in such a manner as to intersect with the plural already formed longitudinal concave grooves 7, and as to continuously extend in the direction of width thereof and as to intermittently extend in the longitudinal direction (see FIG. 7). Consequently, as illustrated in FIG. 7, the earlier formed longitudinal concave grooves 7 and the later formed lateral concave grooves 8 intersect with the other kind of the grooves (when one kind of the grooves is the longitudinal concave grooves 7, the other kind thereof is the lateral concave grooves 8, whereas when one kind of the grooves is the lateral concave grooves 8, the other kind thereof is the longitudinal concave grooves 7). Thus, a surface pattern consisting of quadrangles consecutively formed in both the longitudinal direction and the lateral direction by the longitudinal concave grooves 7 and the lateral concave grooves 8, which are monotonous straight lines extending in the longitudinal and lateral directions, appears like a cross pattern woven in a cloth.

Figure 8:
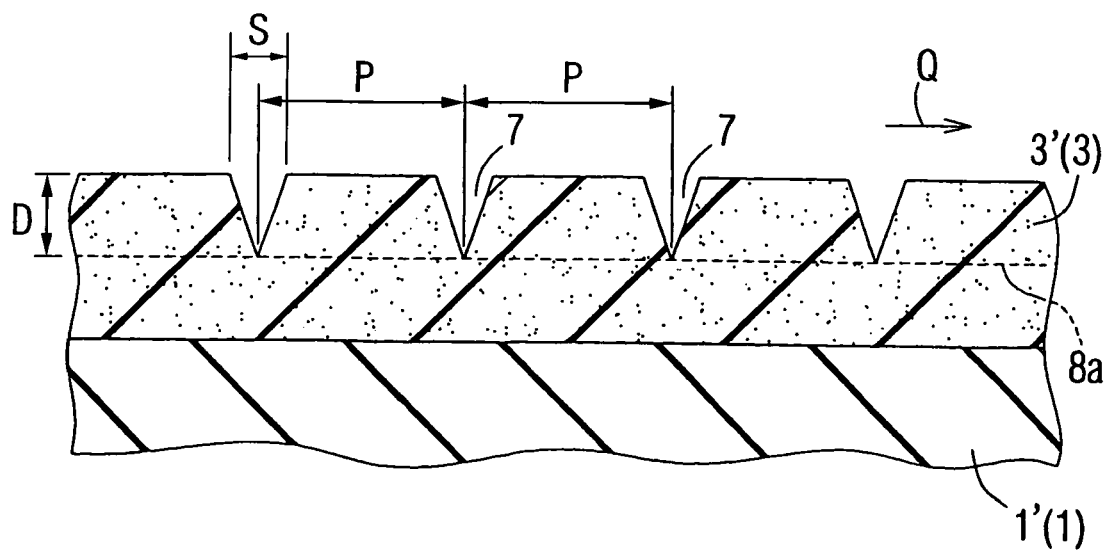
FIG. 8 is a cross-sectional view taken along line Z-Z in FIG. 7.

Incidentally, in this embodiment, the formation pitch P, the width S and the depth D of the longitudinal concave grooves 7 are equal to those of the lateral concave grooves 8, respectively, as shown in FIGS. 6 and 8. Incidentally, the formation pitch P, the width S and the depth D of the longitudinal concave grooves 7 may be different from those of the lateral concave grooves 8. Preferably, the formation pitch P of each of the concave grooves 7 and 8 ranges from 0.1 mm to 5 mm. In the case where the formation pitch P, the width S and the depth D of the longitudinal concave grooves 7 and the lateral concave grooves 8 are set within the aforementioned range, when the weather strip $W_1'$ is completed, the appearance of the quadrangular surface pattern becomes more closely resembles the actual part enwoven in the cloth. Consequently, the decorativeness thereof is enhanced. Preferably, the width S of each of the opening portions of the concave grooves 7 and 8 is smaller than the formation pitch P. Incidentally, in FIG. 6, reference character 7a designates a line of the bottom portion of the longitudinal concave groove 7. In FIG. 8, reference character 8a denotes a line of the bottom portion of the lateral concave groove 8. Further, the lines 7a and 8a can be set so that the depths thereof can be made to equal to each other. Preferably, the depths of these concave grooves remains within that of the ornamental portion in the direction of thickness thereof (that is, the depths of these concave grooves do not reach a rubber part of an attaching portion of a base).

The explosion temperature of the outer shell of each of the microcapsules dispersed in the rubber material $M_3$ of the predetermined ornamental-portion forming part 3' by being mixed and kneaded is higher than the extrusion molding temperature (usually, 50° C. to 90° C.) of the rubber material $M_3$. Thus, the outer shell of each of the microcapsules 6 does not soften and burst before and after the predetermined ornamental-portion forming part 3' is extruded from the rubber extrusion die F. When the involved gas expands, the entire microcapsule 6 slightly expands. Alternatively, the entire microcapsules 6, which do not expand and have been in an unexpanded state, are put into a state in which the microcapsules 6 are dispersed into the rubber material $M_3$ constituting the predetermined ornamental-portion forming part 3'. Then, the microcapsules 6 are fed to a heated vulcanizing tank G (see FIG. 1).

Figure 9:
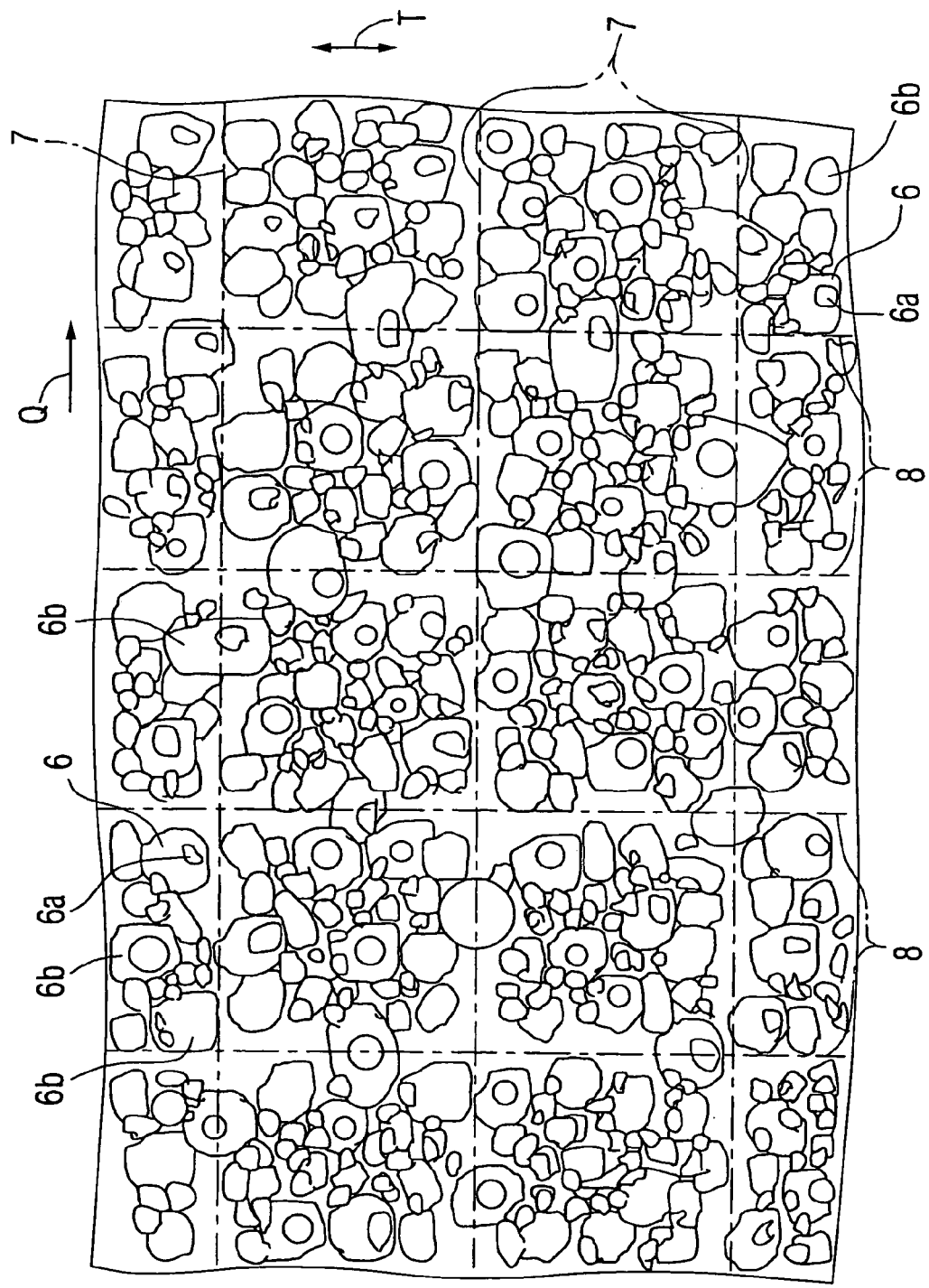
FIG. 9 is a partly enlarged plan view illustrating an ornamental portion, which mainly shows the relation among many microcapsules exposed on a surface thereof, longitudinal concave grooves and lateral concave grooves.
Figure 10:
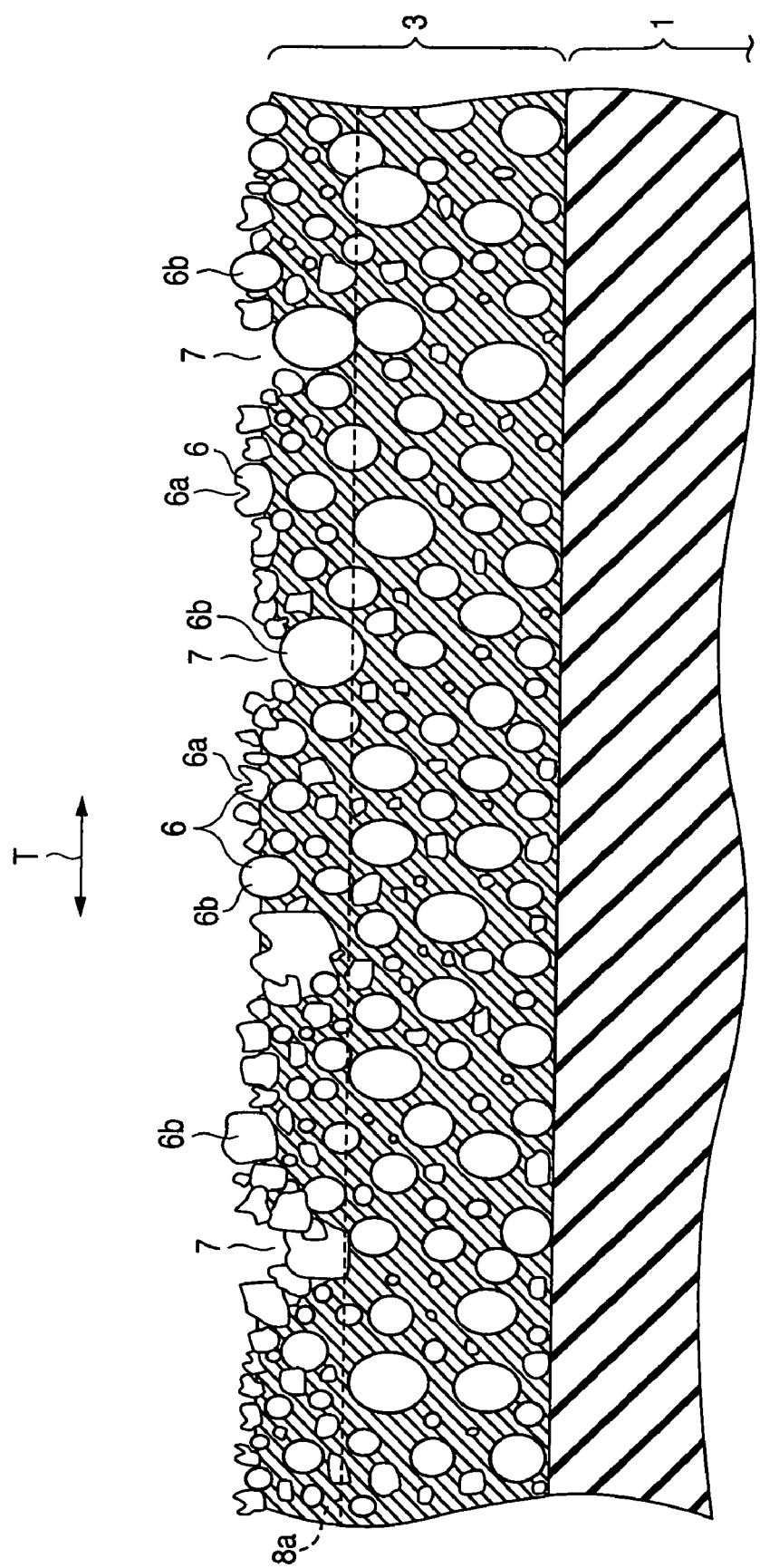
FIG. 10 is a cross-sectional view illustrating the ornamental portion.
Figure 11:
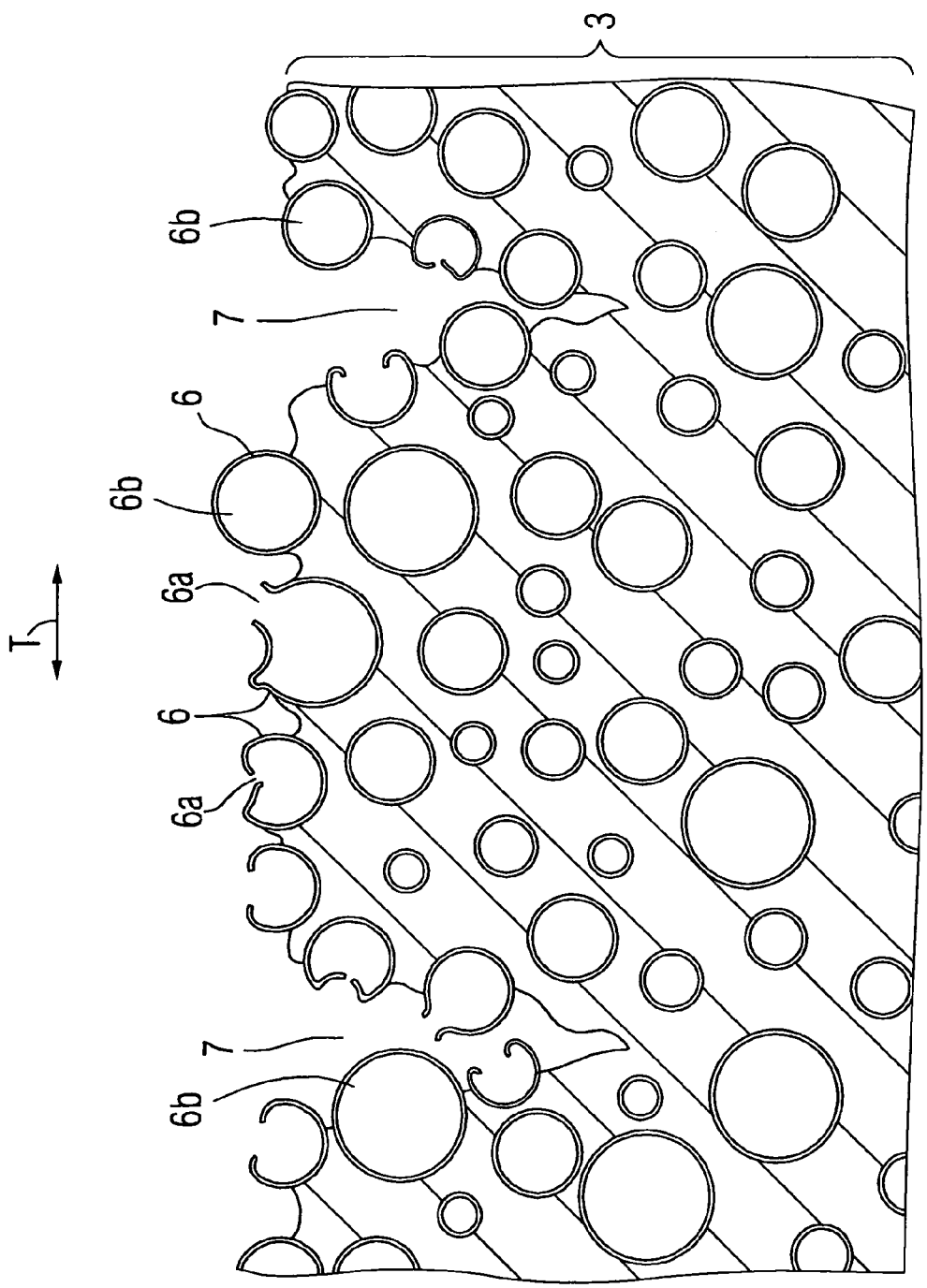
FIG. 11 is a schematic enlarged cross-sectional view illustrating the ornamental portion of the weather strip, which mainly shows the expansion explosion and the expansion projection of the microcapsule.

In the heated vulcanizing tank G, first, the predetermined ornamental-portion forming part 3' of the weather strip $W_1'$ as parts of the weather strip $W_1'$, which is in the process of molding, or the entire weather strip $W_1'$ is heated (usually at a temperature of 180° C. to 230° C.) by high-frequency waves, microwaves, or hot air or the like. Thus, the unvulcanized rubber of each of the predetermined attaching-portion forming part 1', the predetermined seal-portion forming part 2', and the predetermined ornamental-portion forming part 3' are vulcanized by being heated. Further, in this vulcanizing process, the predetermined seal-portion forming part 2' and the predetermined ornamental-portion forming part 3' are vulcanized and connected firmly and integrally to the predetermined attaching-portion forming part 1'. According to this embodiment, the heating temperature of the vulcanizing tank G is set to be equal to or higher than the explosion temperature of the outer shell of each of the microcapsules 6 mixed and kneaded in the material $M_3$ constituting the predetermined ornamental-portion forming part 3'. Thus, many microcapsules 6 are expanded by heat given during the vulcanization. A part of the microcapsules 6, especially, the outer shells of those on or in the vicinity of the outer surface of the predetermined ornamental-portion forming part 3' exceed the expansion limit and burst. FIG. 9 is a partly enlarged plan view illustrating the predetermined ornamental portion forming part 3', which mainly shows the relation among the many microcapsules 6 exposed on the surface thereof, the longitudinal concave grooves 7 and the lateral concave grooves 8. FIG. 10 is a cross-sectional view illustrating the ornamental portion. FIG. 11 is a schematic enlarged cross-sectional view illustrating the predetermined ornamental portion forming part 3' of the weather strip $W_1'$, which mainly shows the expansion explosion and the expansion projection of the microcapsules 6. As shown in FIGS. 9 to 11, the outer shells of the microcapsules 6 in the vicinity of the surface or exposed on the surface of the predetermined ornamental-portion forming part 3' are softened by being heated. The outer shells of the microcapsules 6, which exceed the limit, are expanded and burst. Thus, many concave portions 6a of the outer shells are outwardly exposed, or the microcapsules 6, whose outer shells are expanded in the vicinity of the surface, are outwardly expanded and projected. Thus, many expanded projection portions 6b are formed. In this embodiment, before the predetermined ornamental-portion forming part 3' are vulcanized, the longitudinal concave groove portions 7 and the lateral concave groove portions 8 are formed thereon in such a way as to intersect with one another. Even in the concave grooves 7 and 8, the exposure of the concave portions 6a of the outer shells and the generation of the expanded projection portions 6b irregularly occur. The predetermined ornamental-portion forming part 3' are volume-expanded with the expansion of the microcapsules. The widths of the concave grooves are reduced. Moreover, the concave grooves 7 and 8 are broken or deformed in the middle thereof by the concave portions 6a of the outer shells and the expanded projection portions 6b. Thus, the pattern more closely resembles that of the woven cloth. The manufacturing method according to this embodiment features that many microcapsules 6 mixed and kneaded in the rubber material for forming the predetermined ornamental-portion forming part 3' are expanded or burst by the heat given at the vulcanization through the use of the heated vulcanizing tank G.

Figure 12:
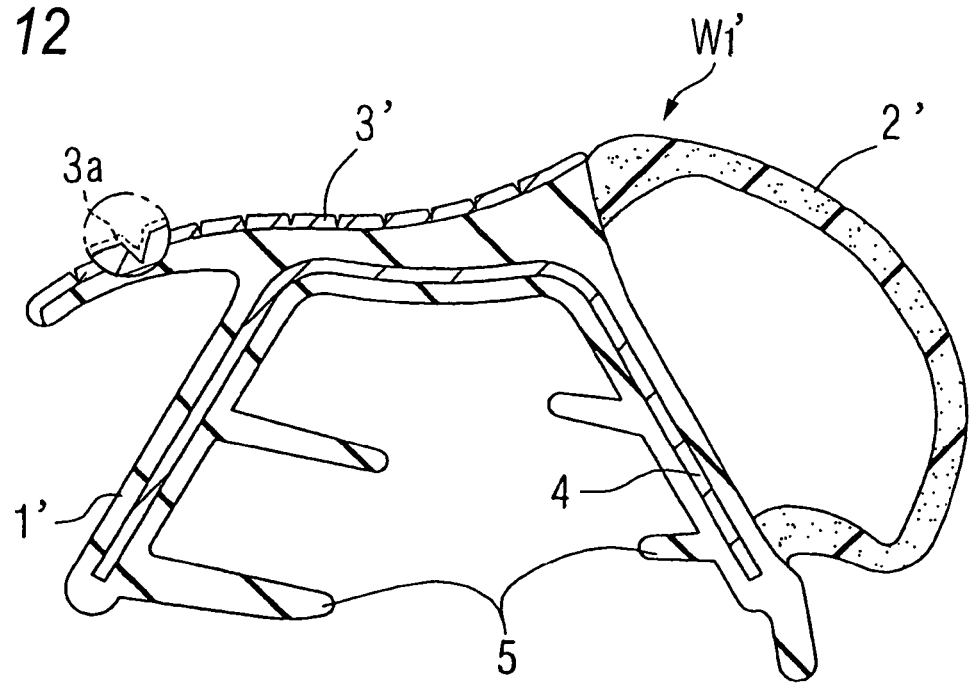
FIG. 12 is a cross-sectional view illustrating the weather strip in a state before the attaching portion is folded.

Incidentally, upon completion of vulcanization, to enhance the weather-resistance and the abrasion-resistance of the predetermined ornamental-portion forming part 3', a surface modified layer 3a is formed on the predetermined ornamental-portion forming part 3' as shown in FIG. 12. Clear coating using liquid silicone or colored clear coating is performed by spray coating on the predetermined ornamental-portion forming part 3' during the weather strip $W_1$' passes through a surface coating machine H shown in FIG. 1. Then, the surface modified layer 3a is baked or is dried by a drier machine J. Thereafter, the weather strip $W_1$' is cooled down by a cooling machine K. Upon completion of cooling, the spread reverse-V-shaped metal core 4 embedded in the predetermined attaching-portion forming part 1' is bent by a metal core bending machine (or profiling machine) L in such a way as to be reverse-U-shaped. Thus, the weather strip $W_1$, which is a final product, is manufactured. Incidentally, in FIG. 1, reference character N designates a hauling machine for hauling the elongated weather strip $W_1$', which is in the process of the molding, by applying a hauling force thereto. In FIGS. 7, 9, and 11, reference character "T" designates the direction of width of the ornamental portion 3 (3'). This also applies to other drawings.

As shown in FIG. 9, the longitudinal concave grooves 7 and the lateral concave grooves 8 intersect with one another on the surface of the predetermined ornamental portion forming part 3' of the weather strip $W_1$' formed through the processes. The concave grooves 7 and 8 are partly broken and deformed by intersection parts, the concave portions 6a generated due to the explosion of the microcapsules 6, and the expanded projection portions 6b expanded and projected from the surface. Thus, many woven fabric-like quadrangle patterns are formed lengthwise and crosswise continuously. In addition to the woven fabric-like quadrangle patterns, the surface of the predetermined ornamental portion forming part 3, is roughened by forming uneven patterns due to the expansion and explosion or the expansion and projection of the microcapsules 6. The combination of the woven fabric-like quadrangle patterns and the uneven patterns presents an appearance, which closely resembles actual woven cloth.

Thus, the decorativeness can be enhanced. Furthermore, the ornamental portion 3, whose surface shows an appearance, which closely resembles the appearance of the woven cloth, is formed in a layer on the attaching portion 1 by being vulcanized and connected thereto in such a way as to be integral with the attaching portion 1.

Figure 14:
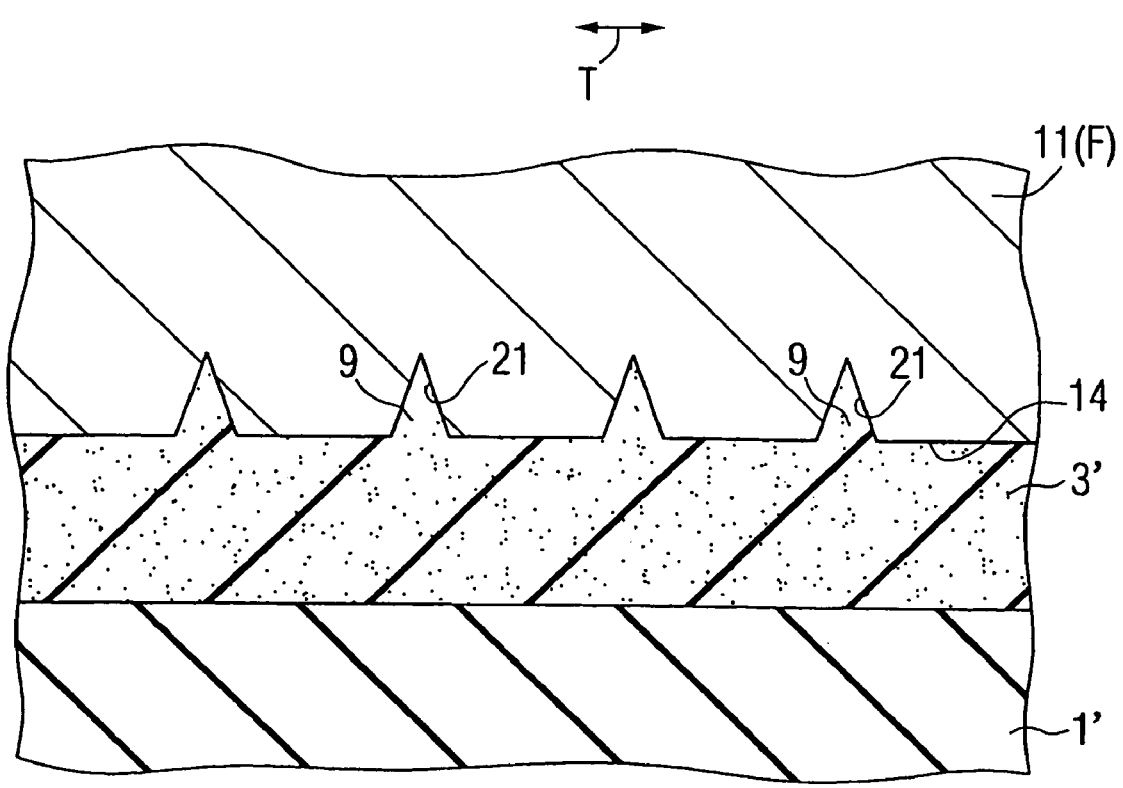
FIG. 14 is a schematic cross-sectional view illustrating that plural grooves are formed in the extrusion surface (the inner wall surface of the flow path) of the orifice of the weather strip of the extrusion die, and that the longitudinal convex ridges are formed in the ornamental portion of the weather strip.

Further, although the aforementioned embodiment is an example in which the longitudinal concave grooves 7 and the lateral concave grooves 8 are formed on the surface of the ornamental portion 3 in such a way as to intersect with one another, the appearance of the surface of the ornamental portion 3 can be made to resemble the woven fabric-like appearance by forming plural recesses 21 in the extrusion surface 14 of the orifice 12 of the rubber extrusion die F (the inner wall surface of the flow path of rubber materials) to thereby form the longitudinal convex ridges 9 on the surface of the ornamental portion 3 of the weather strip $W_1$, as shown in FIG. 14 and also forming the lateral concave grooves by a lateral concave groove providing roller (neither shown) formed with projection ridges along the axial direction on the outer peripheral surface thereof, just after the extrusion and before the vulcanization in such a way as to intersect with the longitudinal convex ridges 9. The shape of the cross-section of each of the convex ridges (or concave grooves) is not limited to a triangular shape (a shape like a letter V). The shape of the cross-section thereof may be either a rectangular shape or a semicircular shape. The convex ridges (or concave grooves) may be formed like a straight line or like a curved line. The interval thereof is not limited to a constant value. The interval thereof may be changed regularly or irregularly. The optimum range, in which the pitch, width, and height of each of the convex ridges are set, is similar to that in the case of the concave grooves (preferably, the height of each of the convex ridges ranges from 0.1 mm to 2 mm).

Figure 15:
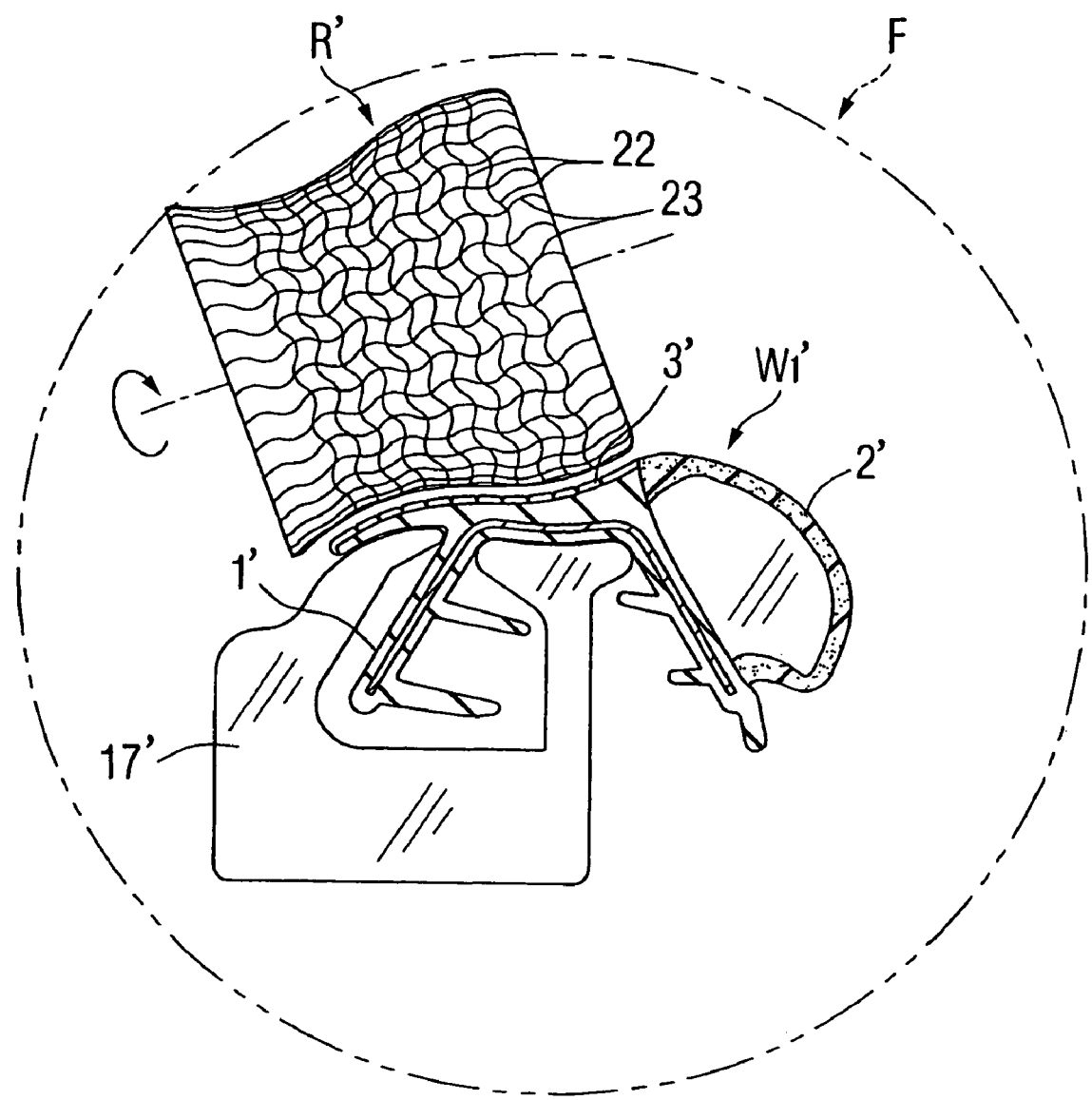
FIG. 15 is a front view illustrating a state in which longitudinal concave curved grooves and lateral concave curved grooves are simultaneously formed in a surface of the predetermined ornamental-portion forming part after the weather strip is extruded from the rubber extrusion die by the concave groove providing roller.
Figure 16:
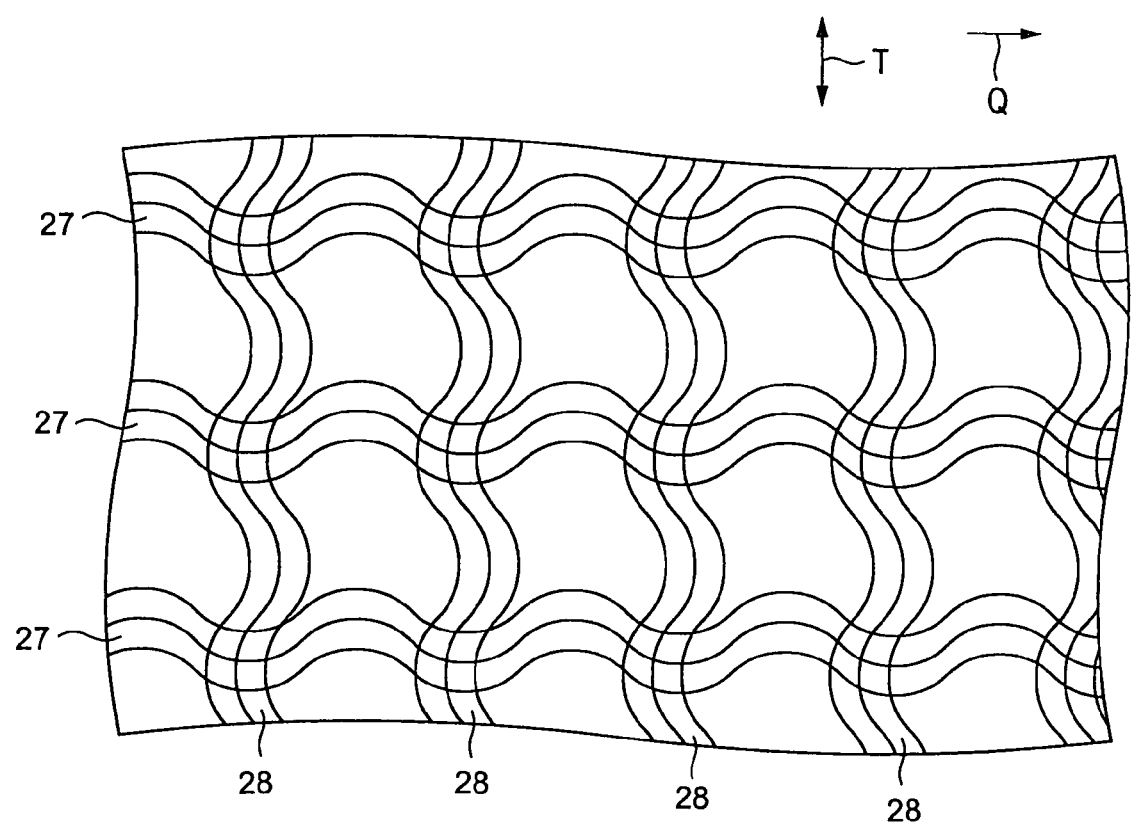
FIG. 16 is a partly exploded plan view illustrating the predetermined ornamental-portion forming part of the weather strip in which the longitudinal concave curved grooves and the lateral concave curved grooves are formed by the concave groove providing roller.

Further, FIG. 15 shows an embodiment in a state in which longitudinal concave grooves and lateral concave grooves of a predetermined ornamental-portion forming part 3' are simultaneously formed by using a roller after a weather strip $W_1$' is extruded from a rubber extrusion die F. In this embodiment, circumferential and lateral (or axial) roller projections 22 and 23 are formed a concave groove providing roller R' in such a way as to be nonlinearly corrugated and as to intersect with each other. Corrugated longitudinal and lateral concave grooves 27 and 28 are formed in the predetermined ornamental-portion forming part 3' by pressing the concave groove providing roller R' against the surface of the predetermined ornamental-portion forming part 3' just after the extrusion in such a manner as to intersect with one another. The concave grooves 27 and 28 are constituted by curved lines, the adjacent ones of which maintain a constant interval therebetween. Thus, a pattern formed by enclosing parts of each of the concave grooves 27 and 28 is shaped like a rectangle constituted by curved lines (see FIG. 16). Incidentally, in FIG. 15, reference character 17' designates a supporting device. Further, a pattern, which more closely resembles an actual woven cloth, can be formed on the surface by combining a rectilinear longitudinal concave groove (or convex ridge) with a curved-line-like lateral concave groove. Further, the interval of the longitudinal concave grooves (or the convex ridges) are not limited to a constant value. Furthermore, the projection heights of the roller projections 22 and 23 are not limited to constant values and may irregularly change. Only one of the longitudinal concave grooves (or the convex ridges) and the lateral concave grooves may be formed.

Figure 17:
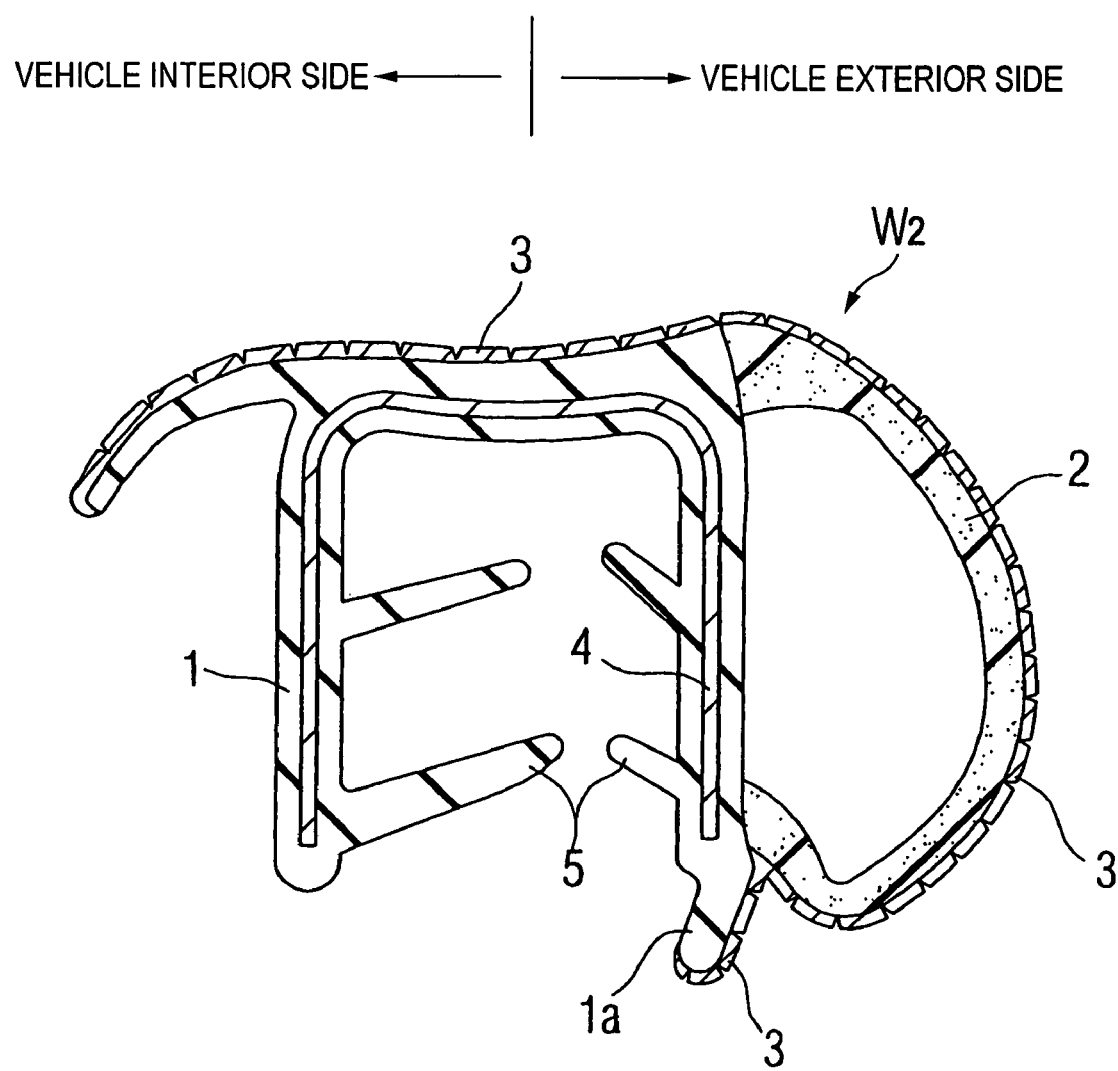
FIG. 17 is across-sectional view illustrating a weather strip serving as a door opening trim.

Further, the weather strip $W_1$ serving as the door opening trim is an example of enhancing the decorativeness thereof by integrally forming the ornamental portion 3 only on a part of the surface of the attaching portion 1 to thereby enable the ornamental portion 3 to show an appearance, which closely resembles the appearance of the woven cloth. A weather strip $W_2$, which is shown in FIG. 17 and serves as a door opening trim, is an example of integrally forming an ornamental portion 3 with a surface of a hollow seal portion 2, which is made of sponge rubber and adapted to be elastically in contact with a rear surface of a door panel (not shown) when the door panel is closed, for preventing water or the like from entering a vehicle interior by the aforementioned molding method. That is, the ornamental portion 3 is continuously and integrally formed with the surface of a part of the attaching portion 1 of the weather strip $W_2$, the entirety of a surface of a hollow seal portion 2, which faces the vehicle exterior side, and a vehicle exterior side of a lip portion 1a provided at an end part of the attaching portion 1. Thus, when the door is opened, the surface side of the hollow seal portion 2 of the weather strip $W_2$ is exposed to the peripheral portion of a body opening of a vehicle. A vehicle exterior side portion of the weather strip $W_2$ is decorated by a pattern, which closely resembles an actual woven cloth and provided by the ornamental portion 3 integrally formed with the entire surface of the hollow seal portion 2. Incidentally, in FIG. 17, same reference character designates a same component shown in FIG. 13.

Figure 18:
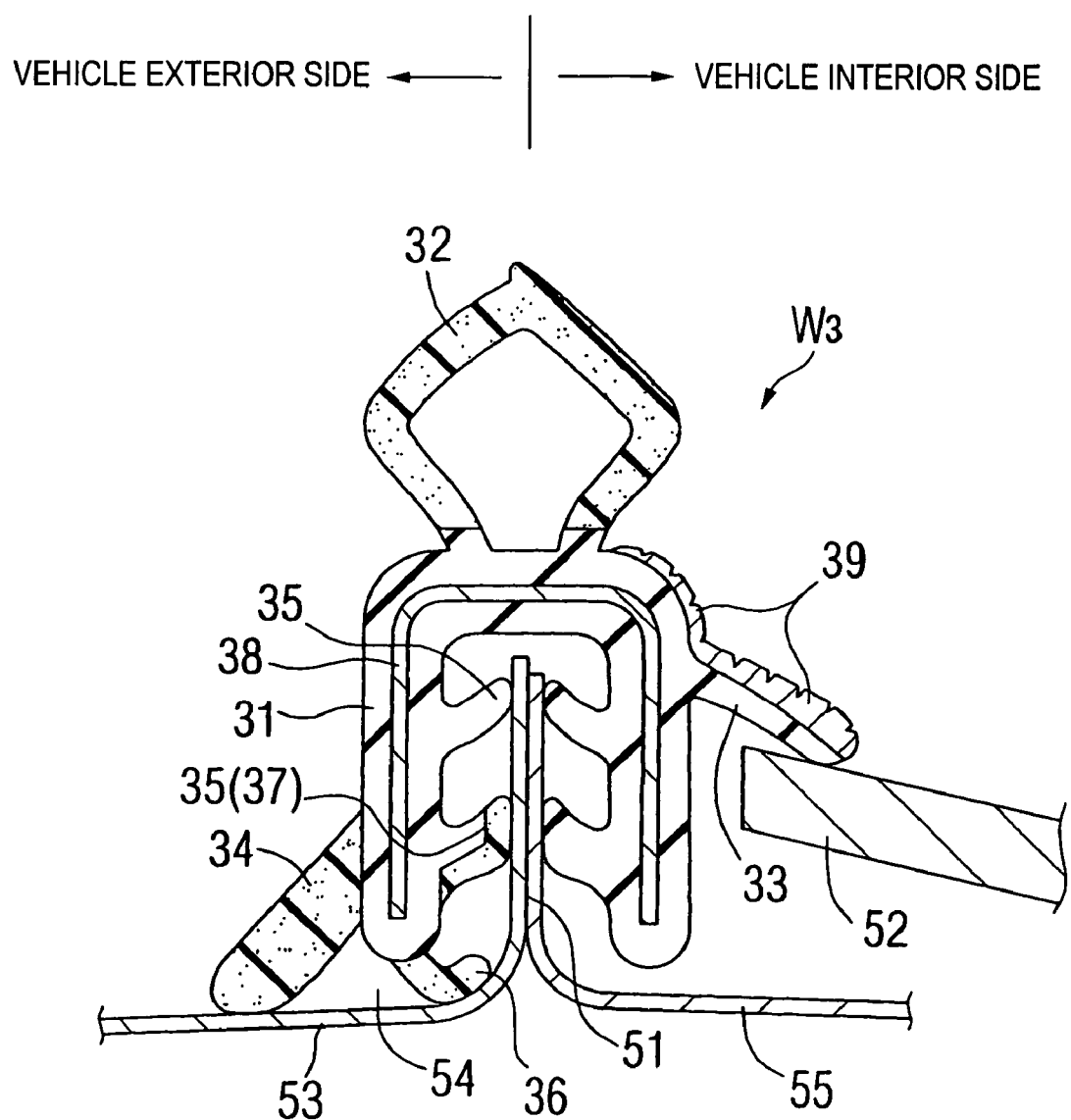
FIG. 18 is a cross-sectional view illustrating a trunk room seal (or weather strip) on which the invention is practiced.

Further, FIG. 18 is a cross-sectional view illustrating a trunk room seal (one of the weather strip) $W_3$ to which the invention is practiced. The trunk room seal $W_3$ has a cross-sectionally substantially-U-shaped attaching portion 31 made of solid rubber, which is attached to a standing flange portion 51 of a panel of a trunk room, and also has a hollow seal portion 32 made of sponge rubber, which is integrally formed with an opposite opening side part of the attaching portion 31 and adapted to be in elastic contact with a rear surface of a lid of a trunk room (neither shown) when the lid is closed, thereby to prevent water or the like from entering inside the trunk room, a concealing lip 33 made of solid rubber, which is integrally formed with a vehicle interior side surface of the attaching portion 31 and adapted to be in elastic contact with a terminal portion of an equipment, such as a carpet 52, in the trunk room thereby to conceal the end portion, and a first seal lip 34 made of sponge rubber, which is integrally formed with a vehicle exterior side surface of the attaching portion 31 and adapted to be in elastic contact with a vehicle exterior side panel 53 of the trunk room thereby to seal the gap 54 between the end part of the attaching portion 31 and the exterior side panel 53. Plural holding lips 35 for supporting the standing flange portion 51 from both sides thereof to thereby enable the trunk room seal $W_3$ to be held by the standing flange portion 51 are integrally formed with the inner peripheral surface of the cross-sectionally substantially-U-shaped attaching portion 31 in such a way as to be opposed to one another. A second seal lip 36 adapted to be in elastic contact with a bent part of the vehicle exterior side panel 53 is integrally formed with the vehicle exterior side end part of the attaching portion 31. Among the plural gripping or holding lips 35, the holding lip 35, which is disposed at the vehicle exterior side and closest to the vehicle exterior side panel 53, has a surface part, which is brought into elastic contact with the standing flange portion 51 and made of a material that is softer than the material of the remaining part of this holding lip 35, and also functions as a third seal lip 37 for performing a sealing action. Regarding the materials of the trunk room seal $W_3$, preferably, the attaching portion 31, a part of the concealing lip 33, and the holding lips 35 are made of vulcanized EPDM. Preferably, the seal portions are formed of a rubber material (for example, vulcanized sponge rubber), which is softer than the vulcanized rubber and excels in elastic deformation. Incidentally, in FIG. 18, reference numeral 38 designates a metal core constituted by a sheet metal strip, which is embedded in and reinforces the attaching portion 31. Reference numeral 55 denotes an inner panel of the trunk room.

Further, regarding the trunk room seal $W_3$, when extruded by the rubber extrusion die, the ornamental portion 39 is formed by the aforementioned molding method in such a manner as to be continuously integral with the surface between the entire concealing lip 33 and a part of the attaching portion 31. The reasons why the ornamental portion 39 shows an appearance closely resembling that of the actual cloth are as described above. When the trunk room is opened by opening the lid thereof, the concealing lip 33, which is connected to the terminal portion of the equipment in the trunk room and most easily comes into sight, and the surface of a part, which is connected to this concealing lip and reaches the attaching portion 31, are decorated by using the ornamental portion 39 in such a way as to have an appearance that resembles the actual woven fabric-like appearance. Consequently, the appearance of the trunk room seal $W_3$ is considerably improved.

Incidentally, in the case where the ornamental portion is integrally formed with the surface of the vehicle exterior side of the hollow seal portion 32 and the attaching portion 31 in the trunk room seal $W_3$, the decorativeness of the trunk room seal $W_3$ at the time of opening the lid of the trunk room is enhanced still more. Further, in the case that it is preferable to protect an ornamental surface, it is sufficient to place a fluorine-denatured-urethane-resin-based, acrylic-resin-based or silicone-resin-based transparent topcoat applicator and to coat the entire surface of the ornamental portion with a transparent topcoat (a coat constituted by a modified layer), which is rich in wear-resistance, weather-resistance, and water-resistance. Incidentally, the term "transparent" not only means "colorlessly transparent" but also includes "colored (or chromatic) transparent". When coated with such a modified layer, the wear-resistance, weather-resistance, water-resistance, and scratch-resistance of the surface are enhanced.

Figure 19:
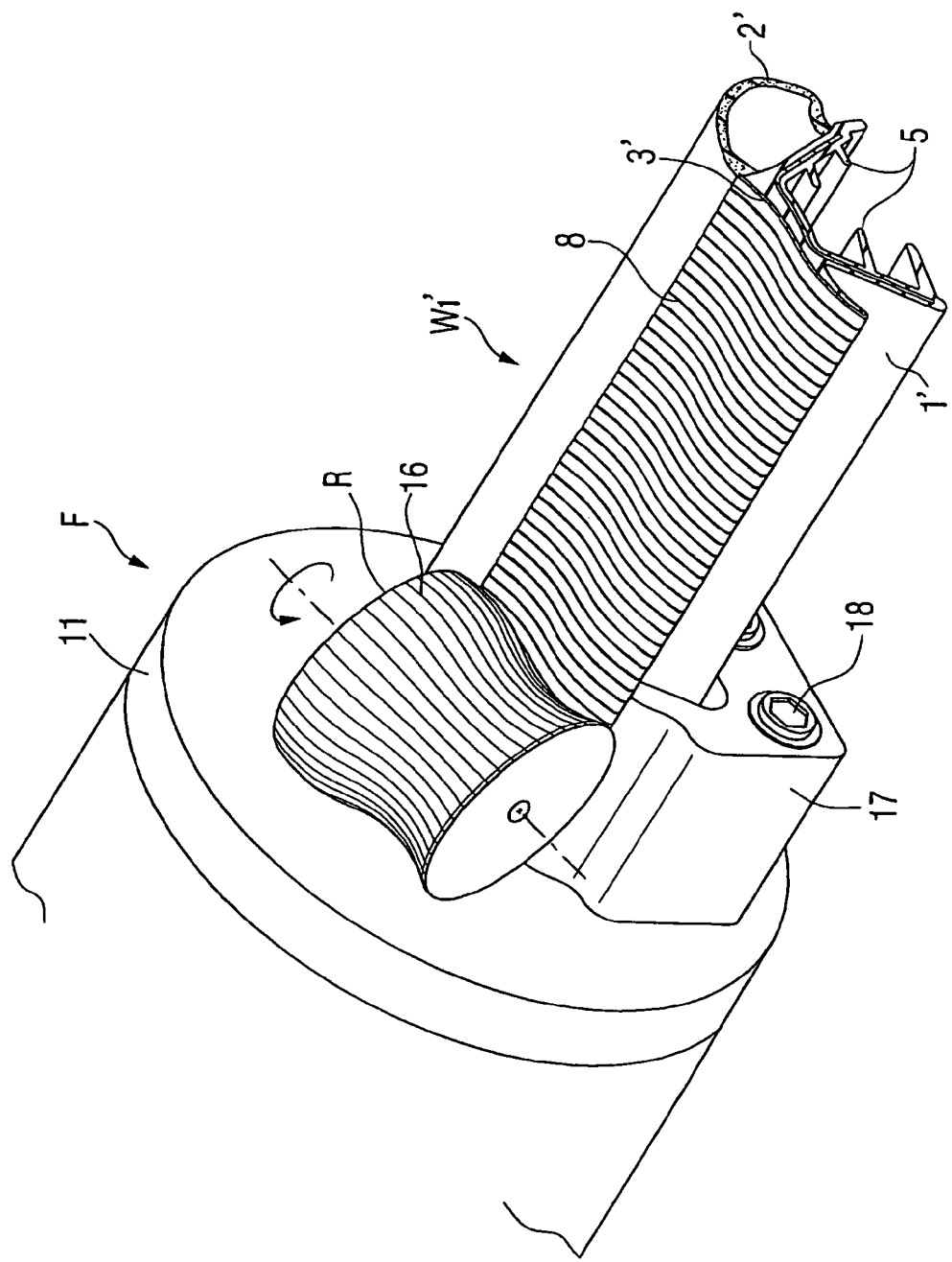
FIG. 19 is a perspective view illustrating an outlet side part of the rubber extrusion die of a modified example.

FIG. 19 shows a modified example of a whether strip in which only lateral concave grooves 8 are formed on a surface of a predetermined ornamental-portion forming part 3' by a lateral concave groove providing roller R. According to this configuration as well, an appearance, which closely resembles that of a woven cloth, is provided.

The invention claimed is:

1. A long ornament member comprising:
   an attaching portion being attachable to a body to be attached; and
   an ornamental portion made of a vulcanized rubber and integrally formed on a surface of the attaching portion;
   wherein the ornamental portion has a surface roughened by a plurality of microcapsules thermally expanded in the ornamental portion, a plurality of concave portions of the microcapsules burst on or in the vicinity of the surface, the concave portions being outwardly opened, and a plurality of projection portions constituted by the microcapsules expanded in the vicinity of the surface and swelling outwardly; and
   wherein the surface of the ornamental portion is provided with at least one of plural convex ridges and plural concave grooves, the convex ridges extending along at least one of a longitudinal direction and a lateral direction that crosses the longitudinal direction, the concave grooves extending along at least one of the longitudinal direction and the lateral direction, and the concave grooves are interrupted or deformed by the plurality of projection portions at irregular positions.

2. The long ornament member according to claim 1, wherein at least one of the convex ridges and the concave grooves are configured in a manner that at least one of discontinuity portions and deformation portions are formed at irregular positions in an extending direction thereof by at least one of the concave portions and the projection portions.

3. The long ornament member according to claim 1, wherein the surface of the ornamental portion is provided with at least one of the convex ridges and concave grooves which extend along the longitudinal direction, and at least one of the convex ridges and concave grooves which extend along the lateral direction.

4. The long ornament member according to claim 1, wherein the convex ridges are formed at an interval that is in a range of 0.1 mm to 5 mm.

5. The long ornament member according to claim 1, wherein the convex ridges are formed in a manner that a projection height of the convex ridges is in a range of 0.1 mm to 2 mm.

6. The long ornament member according to claim 1, wherein the concave grooves are formed at an interval that is in a range of 0.1 mm to 5 mm.

7. The long ornament member according to claim 1, wherein the concave grooves are formed in a manner that a depth of the concave grooves is in a range of 0.1 mm to 2 mm.

8. The long ornament member according to claim 1, wherein the ornamental portion is formed in a layer on the surface of the attaching portion.

9. The long ornament member according to claim 1, wherein a depth of the concave grooves in the ornamental portion is limited within a thickness of the ornamental portion.

10. The long ornament member according to claim 1, wherein the concave grooves in the ornamental portion have substantially V-shaped cross section.

11. The long ornament member according to claim 1, wherein the ornamental portion has a color differing from that of the attaching portion.

12. The long ornament member according to claim 11, wherein the ornamental portion has a color being lighter than that of the attaching portion.

13. The long ornament member according to claim 1, wherein at least one of the convex ridges and the concave grooves of the ornamental portion are formed substantially like a straight line.

14. The long ornament member according to claim 1, wherein at least one of the convex ridges and the concave grooves of the ornamental portion are formed substantially like a wavy line.

15. The long ornament member according to claim 1, wherein a surface modified layer that enhances at least one of wear-resistance and weather-resistance is formed on the surface of the ornamental portion.

16. The long ornament member according to claim 15, wherein the modified layer is a transparent layer through which the surface of the ornamental portion is visible.

17. The long ornament member according to claim 15, wherein the modified layer is a silicone resin coat.

18. The long ornament member according to claim 1, wherein the long ornament member is a vehicle weather strip.

19. The long ornament member according to claim 18, wherein the weather strip is a door opening trim.

20. The long ornament member according to claim 19, wherein the door opening trim has a concealing lip and the ornamental portion is integrally formed on at least one of a surface of the concealing lip and a vehicle interior side surface of the attaching portion.

21. The long ornament member according to claim 18, wherein the weather strip has a hollow seal portion, and the ornamental portion is integrally formed on a surface of the hollow seal portion.

22. The long ornament member according to claim 18, wherein the weather strip is a trunk seal trim.

23. The long ornament member according to claim 22, wherein the trunk seal trim has a concealing lip and the ornamental portion is integrally formed on at least one of a surface of the concealing lip and a vehicle interior side surface of the attaching portion.

24. The long ornament member according to claim 18, wherein the weather strip further comprises a metal core.

25. A method of manufacturing a long ornament member having an attaching portion being attachable to a body to be attached and an ornamental portion made of a vulcanized rubber integrally formed on a surface of the attaching portion, the method comprising the steps of:
    integrating a predetermined attaching-portion forming part made of an unvulcanized rubber mixed with an vulcanizing agent and a predetermined ornamental-portion forming part made of an unvulcanized rubber mixed with a vulcanizing agent and a plurality of fine thermo-expandable microcapsules and extruding an integrated part from a rubber extrusion die in a state in which at least one of plural longitudinal concave grooves and longitudinal convex ridges continuously extending in parallel on a surface of the predetermined ornamental-portion forming part are formed, the rubber extrusion die having an orifice whose shape corresponds to that of a cross section of the long ornament member and having at least one of projections and recesses formed on an inner surface of an ornamental portion extrusion part of the orifice of the rubber extrusion die;
    heating the predetermined ornamental-portion forming part and forming a plurality of outwardly opened concave portions on a surface of the predetermined ornamental-portion forming part by expanding at least a part of the microcapsules on or in the vicinity of a surface in such a way as to exceed a limit and burst, and expanding the microcapsules provided in the vicinity of the surface of the predetermined ornamental-portion forming part to form a plurality of projection portions swelling outwardly, so that at least one of the longitudinal concave grooves and longitudinal convex ridges of the predetermined ornamental-portion forming part are interrupted or deformed at irregular positions in the longitudinal direction; and
    changing the unvulcanized rubber of the predetermined ornamental-portion forming part and the predetermined attaching-portion forming part into a vulcanized rubber by vulcanizing through the heating of the predetermined ornamental-portion forming part.

26. A method of manufacturing a long ornament member having an attaching portion being attachable to a body to be attached and an ornamental portion made of a vulcanized rubber integrally formed on a surface of the attaching portion, the method comprising the steps of:

extruding a predetermined attaching-portion forming part made of an unvulcanized rubber mixed with a vulcanizing agent and a predetermined ornamental-portion forming part made of an unvulcanized rubber mixed with a vulcanizing agent and a plurality of fine thermo-expandable microcapsules from a rubber extrusion die having an orifice whose shape corresponds to that of a cross section of the long ornament member;

forming at least one of plural longitudinal convex ridges and longitudinal concave grooves continuously extending in parallel on a surface of the extruded predetermined ornamental-portion forming part;

heating the predetermined ornamental-portion forming part and forming a plurality of outwardly opened concave portions on a surface of the predetermined ornamental-portion forming part by expanding at least a part of the microcapsules on or in the vicinity of a surface in such a way as to exceed a limit and burst, and expanding the microcapsules provided in the vicinity of the surface of the predetermined ornamental-portion forming part to form a plurality of projection portions swelling outwardly, so that at least one of the longitudinal concave grooves and longitudinal convex ridges are interrupted or deformed at irregular positions in the longitudinal direction; and changing the unvulcanized rubber of the predetermined ornamental-portion forming part and the predetermined attaching-portion forming part into a vulcanized rubber by vulcanizing through the heating of the predetermined ornamental-portion forming part.

27. The method of manufacturing a long ornament member according to claim 25, further comprising:

forming at least one of plural lateral convex ridges and lateral concave grooves in such a way as to extend in a direction crossing the longitudinal convex ridges or the longitudinal concave grooves before completion of vulcanizing of the predetermined ornamental-portion forming part, to thereby form a pattern that is constituted by a plurality of quadrangles each enclosed by at least one of the longitudinal and lateral convex ridges and the longitudinal and lateral concave grooves.

28. The method of manufacturing a long ornament member according to claim 25, wherein the predetermined ornamental-portion forming part is extruded in a state in which the microcapsules are not burst.

29. The method of manufacturing a long ornament member according to claim 25, wherein when heating the predetermined ornamental-portion forming part, the predetermined ornamental-portion forming part is heated to a temperature sufficient to cause an outer shell of the microcapsule to soften and burst due to a pressure of an internal gas, and the unvulcanized rubber is vulcanized by the heating of the predetermined ornamental-portion forming part.

30. The method of manufacturing a long ornament member according to claim 29, wherein before completion of vulcanizing the unvulcanized rubber of the predetermined ornamental-portion forming part, at least softening and expansion of the outer shell of the microcapsule are finished.

31. The method of manufacturing a long ornament member according to claim 29, wherein during the predetermined ornamental-portion forming part made of the unvulcanized rubber is heated, at least softening and expansion of the outer shell of the microcapsule are started when Mooney viscosity of the predetermined ornamental-portion forming part is lowered by the heating than that of the predetermined ornamental-portion forming part before being heated.

32. The method of manufacturing a long ornament member according to claim 25, wherein expansion of the microcapsules and volume-expansion of the predetermined ornamental-portion forming part are performed by heating the predetermined ornamental-portion forming part, in the surface of which concave grooves each having a predetermined width are formed, to thereby reduce the width of the concave grooves from the width of the concave grooves before being heated.

33. A method of manufacturing a long ornament member having an ornamental portion made of a vulcanized rubber, the method comprising the steps of:

extruding the long ornament member with a predetermined ornamental-portion forming part made of an unvulcanized rubber mixed with a vulcanizing agent and a plurality of fine thermo-expandable microcapsules from a rubber extrusion die in a state in which at least one of plural longitudinal concave grooves and longitudinal convex ridges continuously extending in parallel on a surface of the predetermined ornamental-portion forming part are formed, the rubber extrusion die having an orifice whose shape corresponds to that of a cross section of the long ornament member and having at least one of plural projections and recesses formed on an inner surface of an ornamental portion extrusion part of the orifice of the rubber extrusion die; and heating the predetermined ornamental-portion forming part to expand and/or burst the microcapsules.

34. A method of manufacturing a long ornament member having an ornamental portion made of a vulcanized rubber, the method comprising the steps of:

extruding the long ornament member with a predetermined ornamental-portion forming part made of an unvulcanized rubber mixed with a vulcanizing agent and a plurality of fine thermo-expandable microcapsules from a rubber extrusion die having an orifice whose shape corresponds to that of a cross section of the long ornament member;

forming at least one of plural longitudinal convex ridges and longitudinal concave grooves continuously extending in parallel on a surface of the extruded predetermined ornamental-portion forming part; and heating the predetermined ornamental-portion forming part to expand and/or burst the microcapsules.

* * * * *